(12) United States Patent
Heo et al.

(10) Patent No.: US 12,470,698 B2
(45) Date of Patent: *Nov. 11, 2025

(54) MPM LIST-BASED INTRA PREDICTION METHOD AND DEVICE

(71) Applicant: BEIJING XIAOMI MOBILE SOFTWARE CO., LTD., Beijing (CN)

(72) Inventors: Jin Heo, Seoul (KR); Sunmi Yoo, Seoul (KR); Ling Li, Seoul (KR); Jangwon Choi, Seoul (KR); Jungah Choi, Seoul (KR)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/733,676

(22) Filed: Jun. 4, 2024

(65) Prior Publication Data
US 2024/0323355 A1   Sep. 26, 2024

Related U.S. Application Data

(63) Continuation of application No. 17/431,025, filed as application No. PCT/KR2020/002486 on Feb. 20, 2020, now Pat. No. 12,047,556.

(60) Provisional application No. 62/808,287, filed on Feb. 20, 2019.

(51) Int. Cl.
*H04N 19/105* (2014.01)
*H04N 19/132* (2014.01)
*H04N 19/159* (2014.01)
*H04N 19/176* (2014.01)
*H04N 19/46* (2014.01)

(52) U.S. Cl.
CPC ........ *H04N 19/105* (2014.11); *H04N 19/132* (2014.11); *H04N 19/159* (2014.11); *H04N 19/176* (2014.11); *H04N 19/46* (2014.11)

(58) Field of Classification Search
None
See application file for complete search history.

(56) References Cited

U.S. PATENT DOCUMENTS

2018/0184082 A1\* 6/2018 Yoo ................. H04N 19/159
2021/0176493 A1\* 6/2021 Wang ............... H04N 19/176

\* cited by examiner

*Primary Examiner* — Stuart D Bennett
(74) *Attorney, Agent, or Firm* — Cozen O'Connor

(57) ABSTRACT

A video decoding method according to the present document is characterized by comprising: obtaining Most Probable Mode (MPM) index information and reference line index information from a bitstream; compiling an MPM list including candidate intra prediction modes for the intra prediction of a current block; deriving an intra prediction mode for the current block from among the candidate intra prediction modes included in the MPM list on the basis of the MPM index information; generating prediction samples for the current block on the basis of the intra prediction mode; and generating reconstructed samples for the current block on the basis of the prediction samples, wherein the step for compiling the MPM list involves deriving a DC mode as one of the candidate intra prediction modes, and including the DC mode in the MPM list, the DC mode being derived on the basis of the value of reference line index information indicating a reference line used for the intra prediction of the current block not being zero.

10 Claims, 17 Drawing Sheets

(a) MPM LIST INCLUDING 6 CANDIDATES USED IN EXISTING INTRA PREDICTION

| MPM index | INTRA MODE |
|---|---|
| 0 | PLANAR MODE |
| 1 | Angular_40 |
| 2 | DC MODE |
| 3 | Angular_30 |
| 4 | Angular_20 |
| 5 | Angular_10 |

(b) MPM LIST INCLUDING 5 CANDIDATES USED IN MULTIPLE REFERENCE LINE INTRA PREDICTION

| MPM index | INTRA MODE |
|---|---|
| 0 | PLANAR MODE |
| 1 | Angular_40 |
| 2 | DC MODE |
| 3 | Angular_30 |
| 4 | Angular_20 |
| 5 | Angular_10 |

| MPM index | INTRA MODE |
|---|---|
| 0 | Angular_40 |
| 1 | DC MODE |
| 2 | Angular_30 |
| 3 | Angular_20 |
| 4 | Angular_10 |

(c) MPM LIST INCLUDING 5 CANDIDATES USED IN SUBPARTITION INTRA PREDICTION

| MPM index | INTRA MODE |
|---|---|
| 0 | PLANAR MODE |
| 1 | Angular_40 |
| 2 | DC MODE |
| 3 | Angular_30 |
| 4 | Angular_20 |
| 5 | Angular_10 |

| MPM index | INTRA MODE |
|---|---|
| 0 | PLANAR MODE |
| 1 | Angular_40 |
| 2 | Angular_30 |
| 3 | Angular_20 |
| 4 | Angular_10 |

FIG. 12
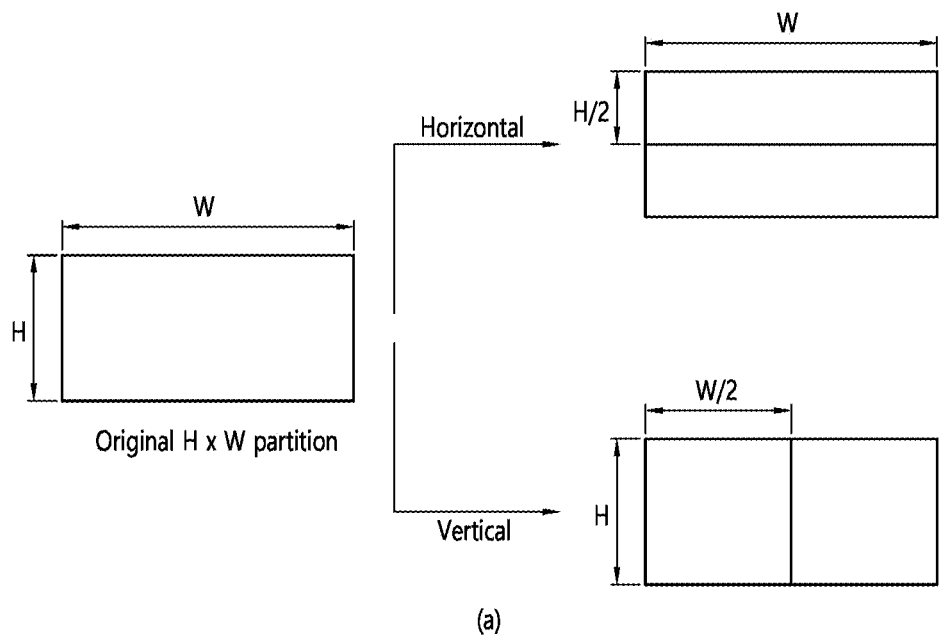
(a)
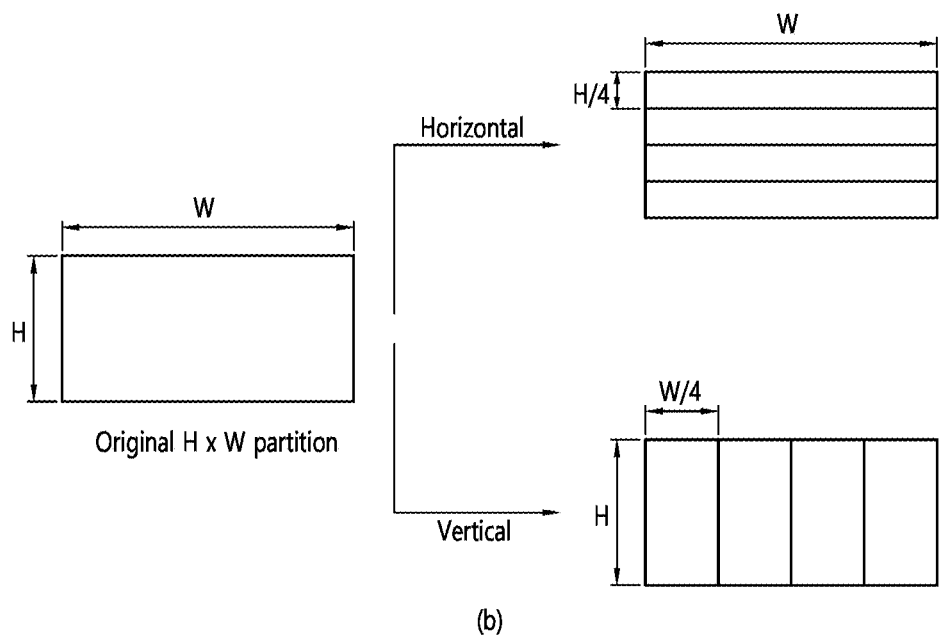
(b)

FIG. 14

(a) MPM LIST INCLUDING 6 CANDIDATES USED IN EXISTING INTRA PREDICTION

| MPM index | INTRA MODE |
|---|---|
| 0 | PLANAR MODE |
| 1 | Angular_40 |
| 2 | DC MODE |
| 3 | Angular_30 |
| 4 | Angular_20 |
| 5 | Angular_10 |

(b) MPM LIST INCLUDING 5 CANDIDATES USED IN MULTIPLE REFERENCE LINE INTRA PREDICTION

| MPM index | INTRA MODE |
|---|---|
| 0 | PLANAR MODE |
| 1 | Angular_40 |
| 2 | DC MODE |
| 3 | Angular_30 |
| 4 | Angular_20 |
| 5 | Angular_10 |

⇒

| MPM index | INTRA MODE |
|---|---|
| 0 | Angular_40 |
| 1 | DC MODE |
| 2 | Angular_30 |
| 3 | Angular_20 |
| 4 | Angular_10 |

(c) MPM LIST INCLUDING 5 CANDIDATES USED IN SUBPARTITION INTRA PREDICTION

| MPM index | INTRA MODE |
|---|---|
| 0 | PLANAR MODE |
| 1 | Angular_40 |
| 2 | DC MODE |
| 3 | Angular_30 |
| 4 | Angular_20 |
| 5 | Angular_10 |

⇒

| MPM index | INTRA MODE |
|---|---|
| 0 | PLANAR MODE |
| 1 | Angular_40 |
| 2 | Angular_30 |
| 3 | Angular_20 |
| 4 | Angular_10 |

MPM LIST-BASED INTRA PREDICTION METHOD AND DEVICE

CROSS-REFERENCE TO RELATED APPLICATIONS

This application is a Continuation of U.S. patent application Ser. No. 17/431,025, filed on Aug. 13, 2021, which is the National Stage filing under 35 U.S.C. 371 of International Application No. PCT/KR2020/002486, filed on Feb. 20, 2020, which claims the benefit of U.S. Provisional Application No. 62/808,287, filed on Feb. 20, 2019, the contents of which are all hereby incorporated by reference herein in their entirety.

BACKGROUND OF THE DISCLOSURE

Field of the Disclosure

The present disclosure relates to an image coding technology and, more particularly, to an image coding method using intra prediction based on a most probable mode (MPM) list and an apparatus therefor.

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

SUMMARY

The present disclosure provides a method and apparatus for improving image coding efficiency.

The present disclosure also provides an efficient intra prediction method and apparatus.

The present disclosure also provides an image coding method and apparatus for deriving an MPM list.

The present disclosure also provides an image coding method and apparatus for deriving a unified MPM list for normal intra prediction, multiple reference line intra prediction, and subpartition intra prediction.

According to one exemplary embodiment of this document, there is provided an image decoding method performed by a decoding apparatus. The method includes: obtaining Most Probable Mode (MPM) index information and reference line index information from a bitstream; constructing an MPM list including candidate intra prediction modes for intra prediction of a current block; deriving an intra prediction mode for the current block among the candidate intra prediction modes included in the MPM list based on the MPM index information; generating prediction samples for the current block based on the intra prediction mode; and generating reconstructed samples for the current block based on the prediction samples, wherein, in the constructing of the MPM list, a DC mode is derived as one of the candidate intra prediction modes and included in the MPM list, based on a case in which a value of the reference line index information indicating a reference line used for the intra prediction of the current block is not equal to 0.

According to another exemplary embodiment of this document, there is provided an image encoding method performed by an encoding apparatus. The method includes: generating reference line index information indicating a reference line used for intra prediction of a current block; constructing a most probable mode (MPM) list including candidate intra prediction modes for the intra prediction of the current block; deriving an intra prediction mode for the current block among the candidate intra prediction modes included in the MPM list; generating MPM index information indicating the intra prediction mode for the current block; and encoding image information including the MPM index information and the reference line index information, wherein, in the constructing of the MPM list, a DC mode is derived as one of the candidate intra prediction modes and included in the MPM list, based on a case in which a value of the reference line index information is not equal to 0.

According to yet another exemplary embodiment of this document, there is provided a computer-readable digital storage medium storing encoded image information that causes a decoding apparatus to perform an image decoding method. The image decoding method includes: obtaining Most Probable Mode (MPM) index information and reference line index information from a bitstream; constructing an MPM list including candidate intra prediction modes for intra prediction of a current block; deriving an intra prediction mode for the current block among the candidate intra prediction modes included in the MPM list based on the MPM index information; generating prediction samples for the current block based on the intra prediction mode; and generating reconstructed samples for the current block based on the prediction samples, wherein, in the constructing of the MPM list, a DC mode is derived as one of the candidate intra prediction modes and included in the MPM list, based on a case in which a value of the reference line index information indicating a reference line used for the intra prediction of the current block is not equal to 0.

According to the present disclosure, overall image/video compression efficiency can be increased.

According to the present disclosure, the complexity of implementation can be reduced through efficient intra prediction, and overall coding efficiency can be enhanced by improving prediction performance.

According to the present disclosure, an intra prediction structure can be simplified by constructing a unified MPM list for normal intra prediction, multiple reference line intra prediction, and subpartition intra prediction, and coding efficiency can be enhanced by efficiently coding an intra prediction mode.

BRIEF DESCRIPTION OF THE DRAWINGS

FIG. 12 illustrates an example of subpartitions being split in accordance with intra subpartitions (ISP).

FIG. 14 is a diagram explaining another embodiment of a method for generating a unified MPM list according to this document.

DESCRIPTION OF EXEMPLARY EMBODIMENTS

Figure 1:
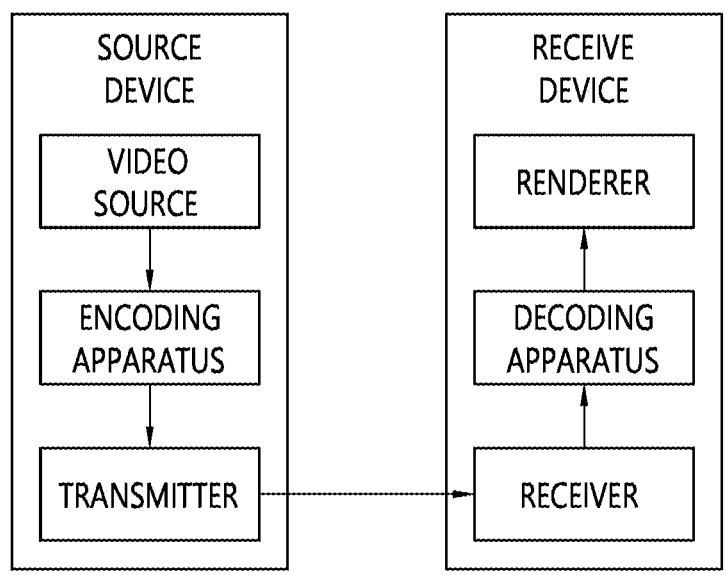
FIG. 1 schematically illustrates an example of a video/image coding system to which embodiments of this document may be applied.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

In this document, the term "A or B" may mean "only A", "only B", or "both A and B". In other words, in this document, the term "A or B" may be interpreted to indicate "A and/or B". For example, in this document, the term "A, B or C" may mean "only A", "only B", "only C", or "any combination of A, B and C".

A slash "/" or a comma used in this document may mean "and/or". For example, "A/B" may mean "A and/or B". Accordingly, "A/B" may mean "only A", "only B", or "both A and B". For example, "A, B, C" may mean "A, B or C".

In this document, "at least one of A and B" may mean "only A", "only B", or "both A and B". Further, in this document, the expression "at least one of A or B" or "at least one of A and/or B" may be interpreted the same as "at least one of A and B".

Further, in this document, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in this document may mean "for example". Specifically, in the case that "prediction (intra prediction)" is expressed, it may be indicated that "intra prediction" is proposed as an example of "prediction". In other words, the term "prediction" in this document is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

In this document, technical features individually explained in one drawing may be individually implemented, or may be simultaneously implemented.

Hereinafter, preferred embodiments of this document are described more specifically with reference to the accompanying drawings. Hereinafter, in the drawings, the same reference numeral is used in the same element, and a redundant description of the same element may be omitted.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

FIG. 1 schematically illustrates an example of a video/image coding system to which embodiments of this document may be applied.

Referring to FIG. 1, a video/image coding system may include a first device (a source device) and a second device (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
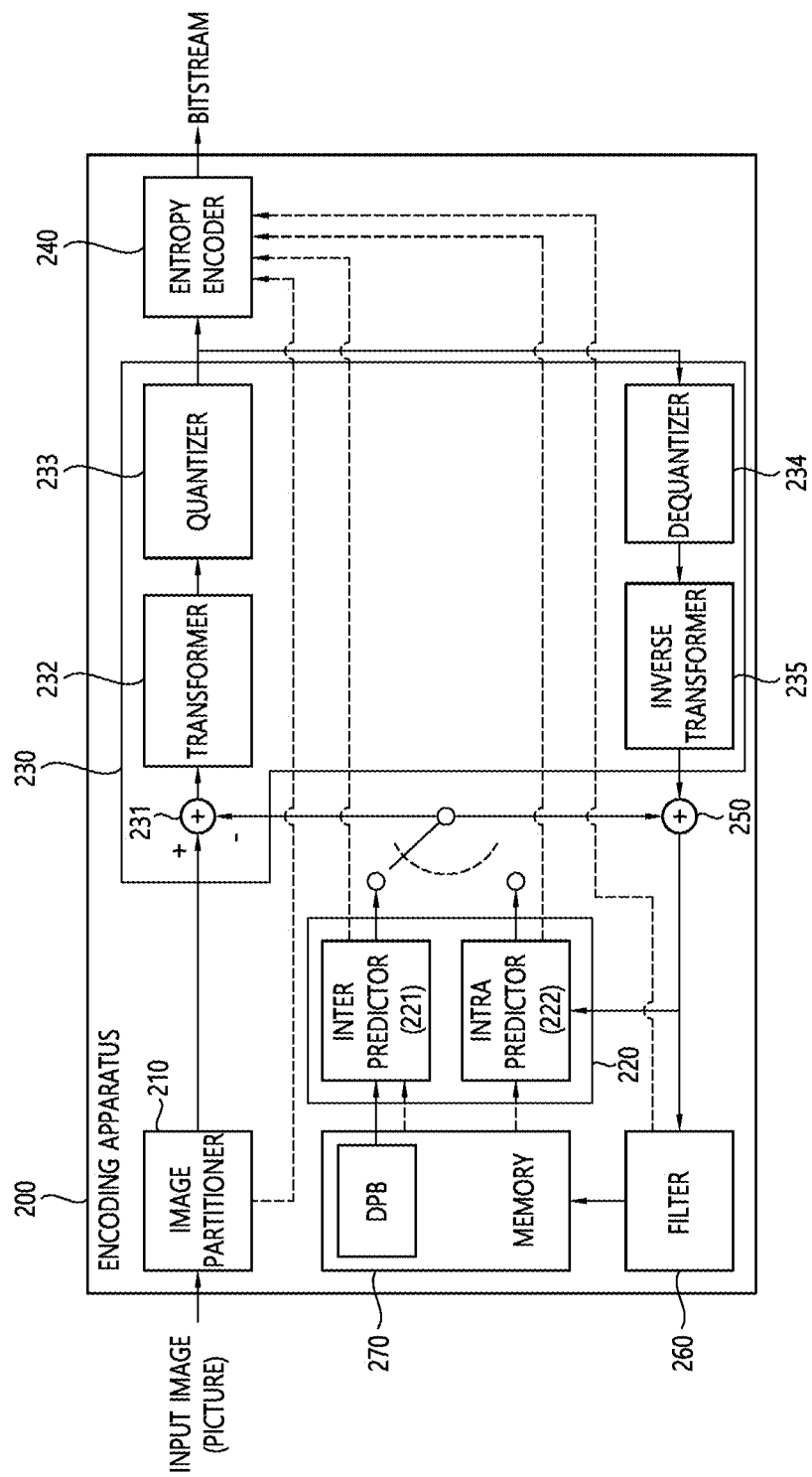
FIG. 2 is a view schematically explaining a construction of a video/image encoding apparatus to which embodiments of this document may be applied.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
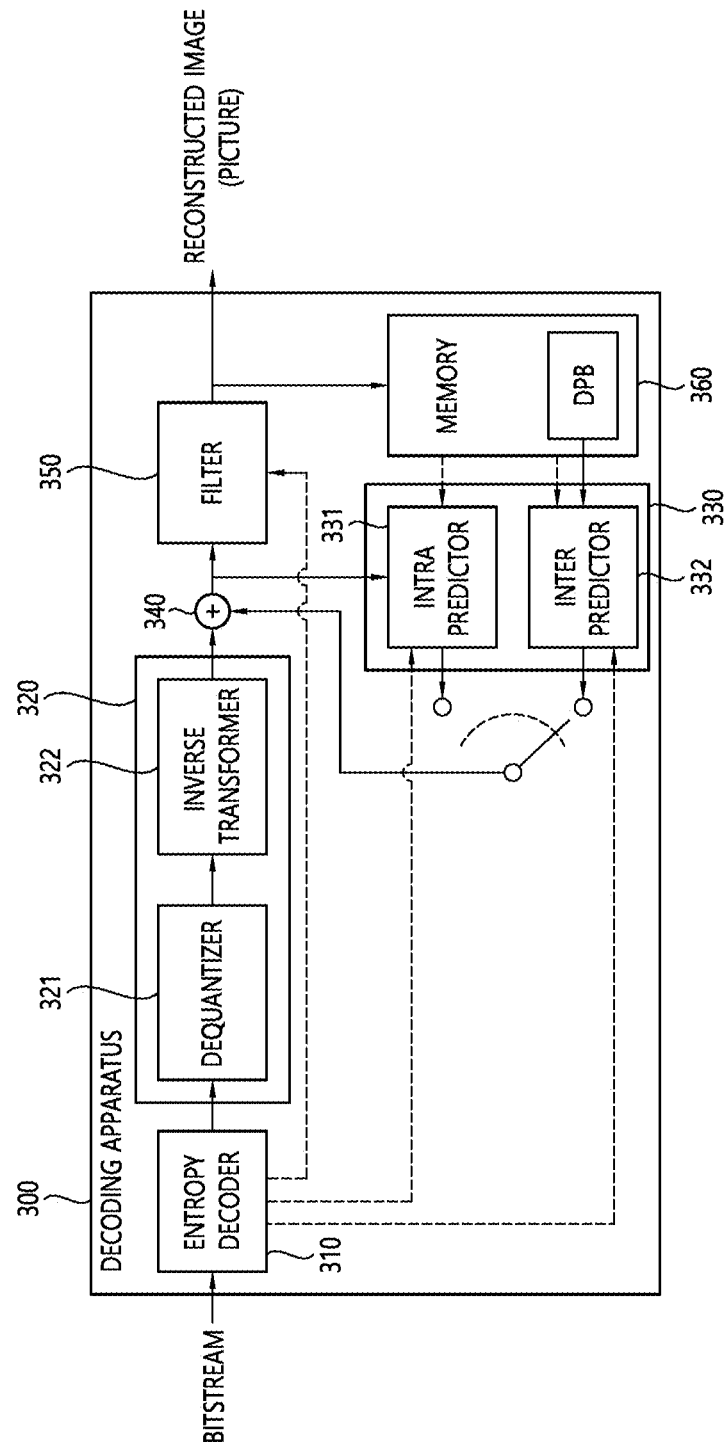
FIG. 3 is a view schematically explaining a construction of a video/image encoding apparatus to which embodiments of this document may be applied.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Meanwhile, if an intra prediction is performed, a correlation between samples may be used, and a difference between the original block and a prediction block, that is, a residual, may be obtained. The aforementioned transform and quantization may be applied to the residual. Accordingly, spatial redundancy can be reduced. Hereinafter, an encoding method and a decoding method using an intra prediction are specifically described.

An intra prediction refers to a prediction for generating prediction samples for a current block based on reference samples outside the current block within a picture (hereinafter a current picture) including the current block. In this case, the reference samples outside the current block may refer to samples adjacent to the current block. If an intra prediction is applied to the current block, neighboring reference samples to be used for the intra prediction of the current block may be derived.

For example, when the size (width×height) of a current block is nW×nH, neighboring reference samples of the current block may include a sample neighboring the left boundary and a total of 2×nH samples neighboring the bottom left of the current block, a sample neighboring the top boundary and a total of 2×nW samples neighboring the top right of the current block, and one sample neighboring the left top of the current block. Alternatively, neighboring reference samples of a current block may also include a plurality of columns of top neighboring samples and a plurality of rows of left neighboring samples. Furthermore, neighboring reference samples of a current block may also include a total of nH samples neighboring the right boundary of the current block having an nW×nH size, a total of nW samples neighboring the bottom boundary of the current block and one sample neighboring the bottom right of the current block.

In this case, some of the neighboring reference samples of the current block have not been decoded or may not be available. In this case, the decoding apparatus may configure neighboring reference samples to be used for a prediction by substituting unavailable samples with available samples. Alternatively, neighboring reference samples to be used for a prediction may be constructed through the interpolation of available samples.

If neighboring reference samples are derived, (i) a prediction sample may be derived based on an average or interpolation of the neighboring reference samples of a current block, and (ii) a prediction sample may be derived based on a reference sample present in a specific (prediction) direction for the prediction sample among neighboring reference samples of a current block. (i) may be applied when an intra prediction mode is a non-directional mode or a non-angular mode. (ii) may be applied when an intra prediction mode is a directional mode or an angular mode.

Further, the prediction sample may also be generated by the interpolation between a first neighboring sample positioned in a prediction direction of the intra prediction mode of the current block and a second neighboring sample positioned in an opposite direction of the prediction direction based on the prediction sample of the current block among the neighboring reference samples. The aforementioned case may be called a linear interpolation intra prediction (LIP). Further, chroma prediction samples may also be generated based on luma samples using a linear model. This case may be called an LM mode.

Further, temporary prediction samples of the current block may be derived based on the filtered neighboring reference samples, and the prediction sample of the current block may also be derived by weighted-summing at least one reference sample, which is derived according to the intra prediction mode among conventional neighboring reference samples, that is, the neighboring reference samples not filtered, and the temporary prediction sample. The aforementioned case may be called a position dependent intra prediction (PDPC).

Further, the prediction sample may be derived using the reference sample positioned in a prediction direction in a corresponding line by selecting a reference sample line with the highest prediction accuracy among the neighboring multi-reference sample lines of the current block, and an intra prediction encoding may be performed by a method for indicating (signaling) the reference sample line used at this time to the decoding apparatus. The aforementioned case may be called multi-reference line (MRL) intra prediction or intra prediction based on the MRL.

Further, the intra prediction may be performed based on the same intra prediction mode by splitting the current block into vertical or horizontal sub-partitions, and the neighboring reference samples may be derived and used in units of sub-partition. That is, in this case, the intra prediction mode for the current block is equally applied to the sub-partitions, and the neighboring reference sample may be derived and used in units of sub-partition, thereby enhancing intra prediction performance in some cases. Such a prediction method may be called intra sub-partitions (ISP) intra prediction or intra prediction based on the ISP.

The aforementioned intra prediction methods may be called an intra prediction type separately from the intra prediction mode. The intra prediction type may be called various terms such as an intra prediction technique or an additional intra prediction mode. For example, the intra prediction type (or the additional intra prediction mode or the like) may include at least one of the aforementioned LIP, PDPC, MRL, and ISP. A general intra prediction method other than specific intra prediction types such as the LIP, the PDPC, the MRL, and the ISP may be called a normal intra prediction type. The normal intra prediction type may be generally applied if the specific intra prediction type is not applied, and the prediction may be performed based on the aforementioned intra prediction mode. Meanwhile, a post-processing filtering for the derived prediction sample may also be performed if necessary.

The drawings below have been prepared to explain specific examples of this document. Since titles of specific devices described in the drawings or specific terms or titles (e.g., syntax title or the like) are exemplarily presented, the technical features of this document are not limited to the specific titles used in the drawings below.

Figure 4:
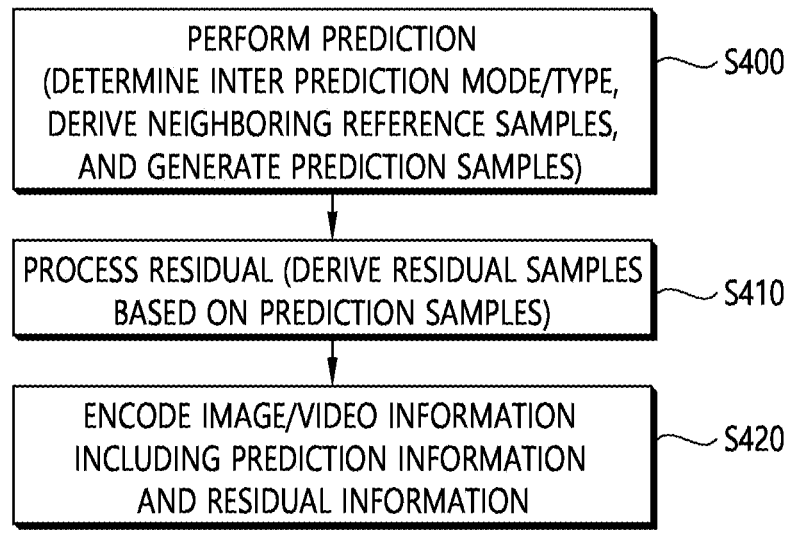
FIG. 4 schematically illustrates an example of an image encoding method based on intra prediction to which the exemplary embodiments of the present document are applicable, and FIG. 5 schematically illustrates an intra predictor in the encoding apparatus.
Figure 5:
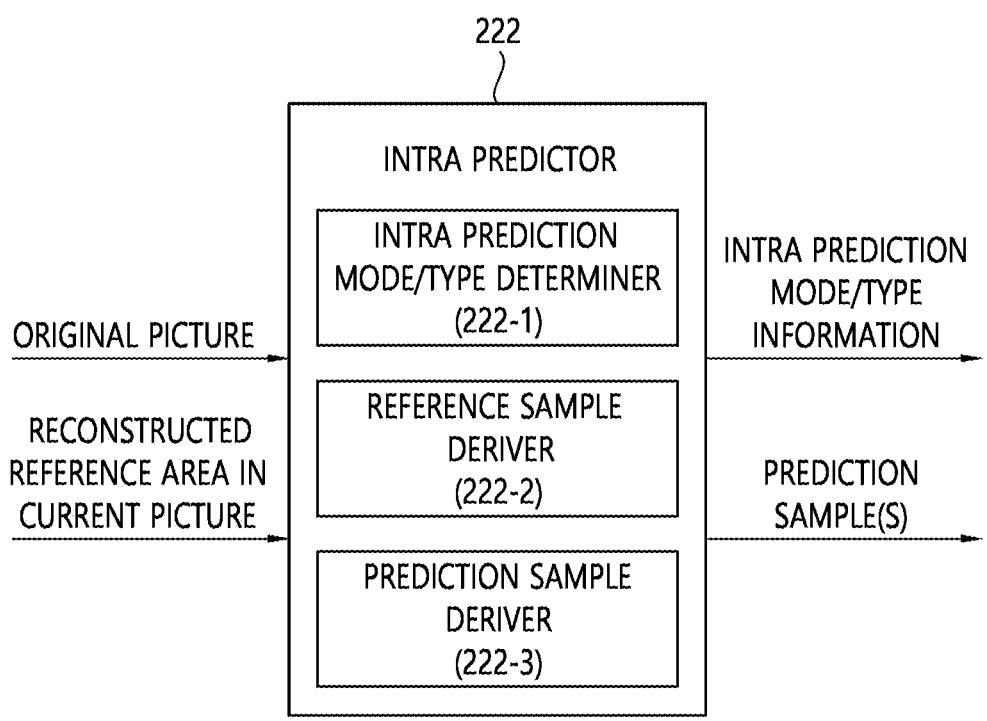

FIG. 4 schematically illustrates an example of an image encoding method based on intra prediction to which the exemplary embodiments of the present document are applicable, and FIG. 5 schematically illustrates the intra predictor in the encoding apparatus. The intra predictor in the encoding apparatus illustrated in FIG. 5 may also be applied to the intra predictor 222 of the encoding apparatus 200 illustrated in FIG. 2 equally or in correspondence thereto.

Referring to FIGS. 4 and 5, S400 may be performed by the intra predictor 222 of the encoding apparatus, and S410 may be performed by the residual processor 230 of the encoding apparatus. Specifically, S410 may be performed by the subtractor 231 of the encoding apparatus. In S420, prediction information may be derived by the intra predictor 222, and encoded by the entropy encoder 240. In S420, residual information may be derived by the residual processor 230, and encoded by the entropy encoder 240. The residual information indicates information on the residual samples. The residual information may include information on quantized transform coefficients for the residual samples. As described above, the residual samples may be derived by transform coefficients through the transformer 232 of the encoding apparatus, and the transform coefficients may be derived by quantized transform coefficients through the quantizer 233. The information on the quantized transform coefficients may be encoded by the entropy encoder 240 through a residual coding procedure.

The encoding apparatus performs the intra prediction for the current block (S400). The encoding apparatus may derive the intra prediction mode/type for the current block, derive the neighboring reference samples of the current block, and generate the prediction samples in the current block based on the intra prediction mode/type and the neighboring reference samples. Here, procedures of determining the intra prediction mode/type, deriving the neighboring reference samples, and generating the prediction samples may also be simultaneously performed, and any one procedure may also be performed earlier than other procedures.

For example, the intra predictor 222 of the encoding apparatus may include an intra prediction mode/type determiner 222-1, a reference sample deriver 222-2, and a prediction sample deriver 222-3, in which the intra prediction mode/type determiner 222-1 may determine the intra prediction mode/type for the current block, the reference sample deriver 222-2 may derive the neighboring reference samples of the current block, and the prediction sample deriver 222-3 may derive the prediction samples of the current block. Meanwhile, although not illustrated, if a prediction sample filtering procedure is performed, the intra predictor 222 may further include a prediction sample filter (not illustrated) as well. The encoding apparatus may determine a mode/a type applied to the current block among a plurality of intra prediction modes/types. The encoding apparatus may compare RD costs for the intra prediction modes/types and determine optimal intra prediction mode/type for the current block.

As described above, the encoding apparatus may also perform the prediction sample filtering procedure. The prediction sample filtering may be called a post filtering. Some or all of the prediction samples may be filtered by the prediction sample filtering procedure. The prediction sample filtering procedure may be omitted in some cases.

The encoding apparatus generates residual samples for the current block based on the (filtered) prediction samples (S410). The encoding apparatus may compare the prediction samples based on phases in original samples of the current block, and derive the residual samples.

The encoding apparatus may encode image information including the information on the intra prediction (prediction information) and the residual information on the residual samples (S420). The prediction information may include intra prediction mode information and intra prediction type information. The residual information may include a residual coding syntax. The encoding apparatus may derive the quantized transform coefficients by transforming/quantizing the residual samples. The residual information may include the information on the quantized transform coefficients.

The encoding apparatus may output the encoded image information in the form of a bitstream. The output bitstream may be delivered to the decoding apparatus through a storage medium or a network.

As described above, the encoding apparatus may generate the reconstructed picture (including reconstructed samples and reconstructed block). To this end, the encoding apparatus may derive (modified) residual samples by dequantizing/inversely transforming the quantized transform coefficients again. As described above, the reason of transforming/quantizing the residual samples and then dequantizing/inversely transforming them again is to derive the same residual samples as the residual samples derived by the decoding apparatus as described above. The encoding apparatus may generate the reconstructed block including the reconstructed samples for the current block based on the prediction samples and the (modified) residual samples. The reconstructed picture for the current picture may be generated based on the reconstructed block. As described above, an in-loop filtering procedure or the like may be further applied to the reconstructed picture.

Figure 6:
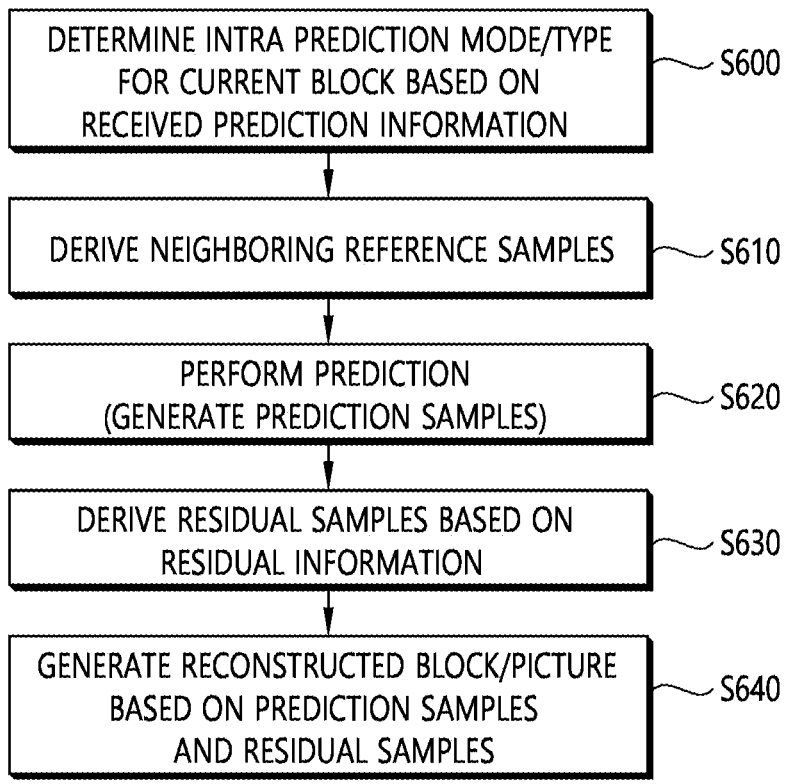
FIG. 6 schematically illustrates an example of an image decoding method based on intra prediction to which the exemplary embodiments of the present document are applicable, and FIG. 7 schematically illustrates an intra predictor in the decoding apparatus.
Figure 7:
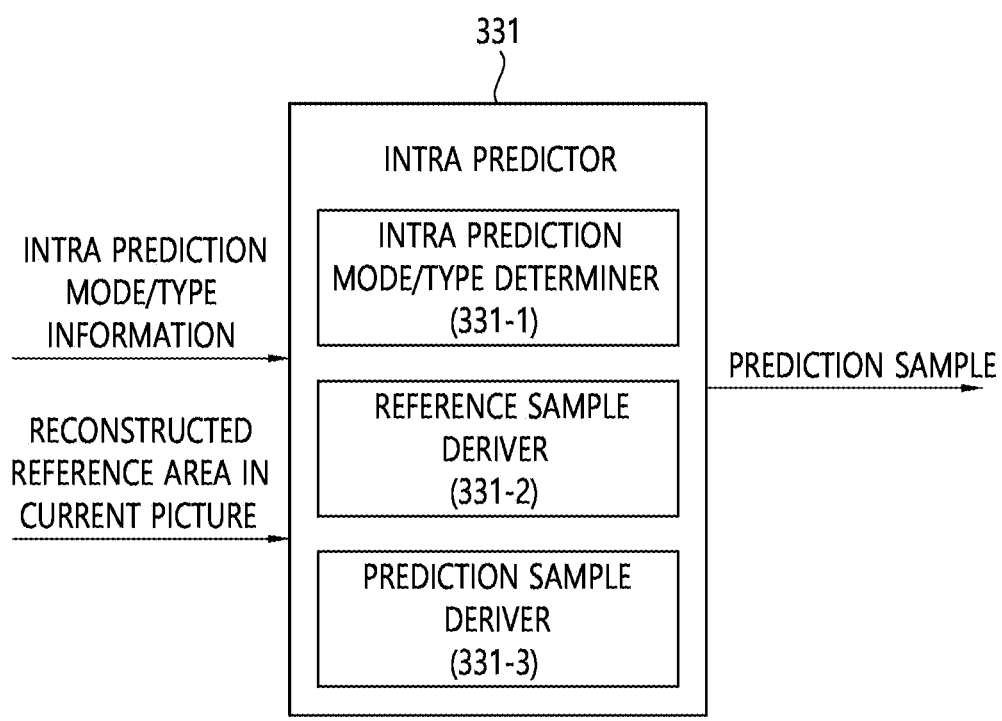

FIG. 6 schematically illustrates an example of an image decoding method based on intra prediction to which the exemplary embodiments of the present document are applicable, and FIG. 7 schematically illustrates the intra predictor in the decoding apparatus. The intra predictor in the decoding apparatus illustrated in FIG. 7 may also be applied to the intra predictor 331 of the decoding apparatus 300 illustrated in FIG. 3 equally or in correspondence thereto.

Referring to FIGS. 6 and 7, the decoding apparatus may perform an operation corresponding to the aforementioned operation performed by the encoding apparatus. S600 to S620 may be performed by the intra predictor 331 of the decoding apparatus, and the prediction information in S600 and the residual information in S630 may be acquired from the bitstream by the entropy decoder 310 of the decoding apparatus. The residual processor 320 of the decoding apparatus may derive the residual samples for the current block based on the residual information. Specifically, the dequantizer 321 of the residual processor 320 may derive the transform coefficients by performing the dequantization, based on the quantized transform coefficients derived based on the residual information, and the inverse transformer 322 of the residual processor derive the residual samples for the current block by inversely transforming the transform coefficients. S640 may be performed by the adder 340 or the reconstructor of the decoding apparatus.

The decoding apparatus may derive the intra prediction mode/type for the current block based on the received prediction information (intra prediction mode/type information) (S600). The decoding apparatus may derive the neighboring reference samples of the current block (S610). The decoding apparatus generates the prediction samples in the current block based on the intra prediction mode/type and the neighboring reference samples (S620). In this case, the decoding apparatus may perform the prediction sample filtering procedure. The prediction sample filtering may be called the post filtering. Some or all of the prediction samples may be filtered by the prediction sample filtering procedure. The prediction sample filtering procedure may be omitted in some cases.

The decoding apparatus generates the residual samples for the current block based on the received residual information (S630). The decoding apparatus may generate the reconstructed samples for the current block based on the prediction samples and the residual samples, and derive the reconstructed block including the reconstructed samples (S640). The reconstructed picture for the current picture may be generated based on the reconstructed block. As described above, the in-loop filtering procedure or the like may be further applied to the reconstructed picture.

Here, the intra predictor 331 of the decoding apparatus may include an intra prediction mode/type determiner 331-1, a reference sample deriver 331-2, and a prediction sample deriver 331-3, in which the intra prediction mode/type determiner 331-1 may determine the intra prediction mode/type for the current block based on the intra prediction mode/type information acquired by the entropy decoder 310, the reference sample deriver 331-2 may derive the neighboring reference samples of the current block, and the prediction sample deriver 331-3 may derive the prediction samples of the current block. Meanwhile, although not illustrated, if the aforementioned prediction sample filtering procedure is performed, the intra predictor 331 may further include the prediction sample filter (not illustrated) as well.

The intra prediction mode information may include, for example, flag information (e.g., intra_luma_mpm_flag) indicating whether a most probable mode (MPM) is applied to the current block or whether a remaining mode is applied thereto. At this time, if the MPM is applied to the current block, the prediction mode information may further include index information (e.g., intra_luma_mpm_idx) indicating one of intra prediction mode candidates (MPM candidates). The intra prediction mode candidates (MPM candidates) may be composed of an MPM candidate list or an MPM list. Further, if the MPM is not applied to the current block, the intra prediction mode information may further include remaining mode information (e.g., intra_luma_mpm_remainder) indicating one of remaining intra prediction modes other than the intra prediction mode candidates (MPM candidates). The decoding apparatus may determine the intra prediction mode of the current block based on the intra prediction mode information.

Further, the intra prediction type information may be implemented in various forms. As an example, the intra prediction type information may include intra prediction type index information indicating one of the intra prediction types. As another example, the intra prediction type information may include at least one of reference sample line information (e.g., intra_luma_ref_idx) indicating whether the MRL is applied to the current block and which reference sample line is used if the MRL is applied, ISP flag information (e.g., intra subpartitions_mode_flag) indicating whether the ISP is applied to the current block, ISP type information (e.g., intra_subpartitions_split_flag) indicating split types of the subpartitions if the ISP is applied, flag information indicating whether the PDCP is applied, or flag information indicating whether the LIP is applied. Further, the intra prediction type information may include an MIP flag indicating whether the MIP is applied to the current block.

The aforementioned intra prediction mode information and/or intra prediction type information may be encoded/decoded by the coding method described in the present document. For example, the aforementioned intra prediction mode information and/or intra prediction type information may be encoded/decoded by an entropy coding (e.g., CABAC, CAVLC) based on a truncated (rice) binary code.

Meanwhile, in case that intra prediction is applied, an intra prediction mode being applied to the current block may be determined using an intra prediction mode of a neighboring block. For example, the decoding apparatus may select one of mpm candidates in a most probable mode (mpm) list derived based on the intra prediction mode of the neighboring block (e.g., left and/or top neighboring block) of the current block and additional candidate modes based on a received mpm index, or may select one of the remaining intra prediction modes that are not included in the mpm candidates (and planar mode) based on the remaining intra prediction mode information. The mpm list may be constructed to include or not to include the planar mode as the candidate. For example, if the mpm list includes the planar mode as the candidate, the mpm list may have 6 candidates, whereas if the mpm list does not include the planar mode as the candidate, the mpm list may have 5 candidates. If the mpm list does not include the planar mode as the candidate, a not planar flag (e.g., intra_luma_not_planar_flag) indicating whether the intra prediction mode of the current block is not the planar mode may be signaled. For example, the mpm flag may be first signaled, and the mpm index and the not planar flag may be signaled when the value of the mpm flag is equal to 1. Further, the mpm index may be signaled when the value of the not planar flag is equal to 1. Here, constructing of the mpm list not to include the planar mode as the candidate is to first identify whether the intra prediction mode is the planar mode by first signaling the flag (not planar flag) since the planar mode is always considered as the mpm rather than that the planar mode is not the mpm.

For example, whether the intra prediction mode being applied to the current block is in the mpm candidates (and planar mode) or in the remaining modes may be indicated based on the mpm flag (e.g., intra_luma_mpm_flag). The mpm flag value of 1 may represent that the intra prediction mode for the current block is in the mpm candidates (and planar mode), and the mpm flag value of 0 may represent that the intra prediction mode for the current block is not in the mpm candidates (and planar mode). The not planar flag (e.g., intra_luma_not_planar_flag) value of 0 may represent that the intra prediction mode for the current block is the planar mode, and the not planar flag value of 1 may represent that the intra prediction mode for the current block is not the planar mode. The mpm index may be signaled in the form of mpm_idx or intra_luma_mpm_idx syntax elements, and the remaining intra prediction mode information may be signaled in the form of rem_intra_luma_pred_mode or intra_luma_mpm_remainder syntax elements. For example, the remaining intra prediction mode information may index the remaining intra prediction modes that are not included in the mpm candidates (and planar mode) among the entire intra prediction modes in the order of their prediction mode numbers, and may indicate one of them. The intra prediction mode may be the intra prediction mode for the luma component (sample). Hereinafter, the intra prediction mode information may include at least one of an mpm flag (e.g., intra_luma_mpm_flag), not planar flag (e.g., intra_luma_not_planar_flag), mpm index (e.g., mpm_idx or intra_luma_mpm_idx), and remaining intra prediction mode information (rem_intra_luma_pred_mode or intra_luma_mpm_remainder). In this document, the mpm list may be called various terms, such as an mpm candidate list, a candidate mode list (candModeList), and a candidate intra prediction mode list.

Generally, when a block for an image is split, a current block to be coded and a neighboring block have similar image properties. Therefore, the current block and the neighboring block are more likely to have the same or similar intra prediction modes. Therefore, the encoder may use the intra prediction mode of the neighboring block to encode the intra prediction mode of the current block. For example, the encoder/decoder may constitute a most probable modes (MPM) list for the current block. The MPM list may also be referred to as an MPM candidate list. Here, the MPM may mean a mode used for improving the coding efficiency in consideration of the similarity between the current block and the neighboring block upon coding the intra prediction mode.

Figure 8:
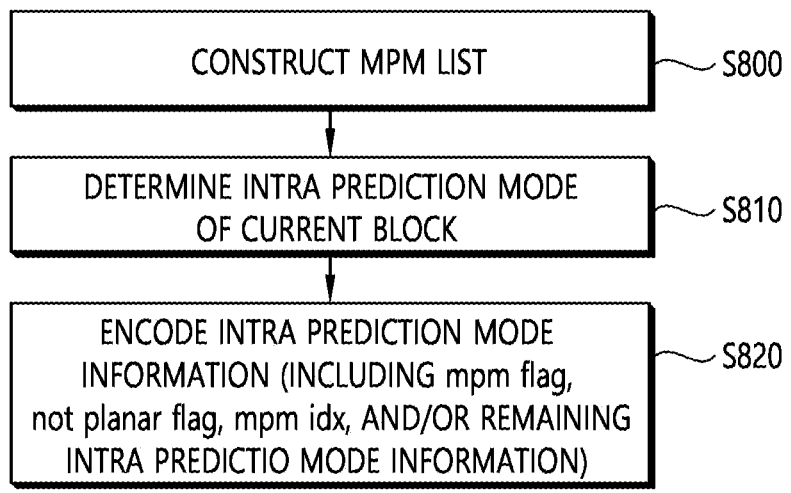
FIG. 8 illustrates an example of an intra prediction method based on the MPM mode in the encoding apparatus to which the exemplary embodiments of the present document are applicable.

FIG. 8 illustrates an example of an intra prediction method based on the MPM mode in the encoding apparatus to which the exemplary embodiments of the present document are applicable.

Referring to FIG. 8, the encoding apparatus constructs the MPM list for the current block (S800). The MPM list may include candidate intra prediction modes (MPM candidates) which are more likely applied to the current block. The MPM list may also include the intra prediction mode of the neighboring block, and further include specific intra prediction modes according to a predetermined method as well. A specific method for constructing the MPM list will be described later.

The encoding apparatus determines the intra prediction mode of the current block (S810). The encoding apparatus may perform the prediction based on various intra prediction modes, and determine an optimal intra prediction mode based on rate-distortion optimization (RDO) based on the above prediction. In this case, the encoding apparatus may also determine the optimal intra prediction mode using only the MPM candidates configured in the MPM list and a planar mode, or also determine the optimal intra prediction mode further using the remaining intra prediction modes as well as the MPM candidates configured in the MPM list and the planar mode.

Specifically, for example, if the intra prediction type of the current block is a specific type (e.g., LIP, MRL, or ISP) other than the normal intra prediction type, the encoding apparatus may determine the optimal intra prediction mode in consideration of only the MPM candidates and the planar mode as the intra prediction mode candidates for the current block. That is, in this case, the intra prediction mode for the current block may be determined only in the MPM candidates and the planar mode, and in this case, the mpm flag may be not encoded/signaled. In this case, the decoding apparatus may estimate that the mpm flag is 1 even without separate signaling of the mpm flag.

Generally, if the intra prediction mode of the current block is not the planar mode and one of the MPM candidates in the MPM list, the encoding apparatus generates the mpm index (mpm idx) indicating one of the MPM candidates. If the intra prediction mode of the current block does not exist even in the MPM list, the encoding apparatus generates the remaining intra prediction mode information indicating a mode such as the intra prediction mode of the current block among the remaining intra prediction modes not included in the MPM list (and the planar mode).

The encoding apparatus may encode the intra prediction mode information to output it in the form of the bitstream (S820). The intra prediction mode information may include the aforementioned mpm flag, not planar flag, mpm index, and/or remaining intra prediction mode information. Generally, the mpm index and the remaining intra prediction mode information have an alternative relationship and are not simultaneously signaled when indicating the intra prediction mode for one block. That is, the value of the mpm flag, 1 and the not planar flag or the mpm index are signaled together, or the value of the mpm flag, 0 and the remaining intra prediction mode information are signaled together. However, as described above, if the specific intra prediction type is applied to the current block, the mpm flag is not signaled and only the not planar flag and/or the mpm index may also be signaled. That is, in this case, the intra prediction mode information may also include only the not planar flag and/or the mpm index.

Figure 9:
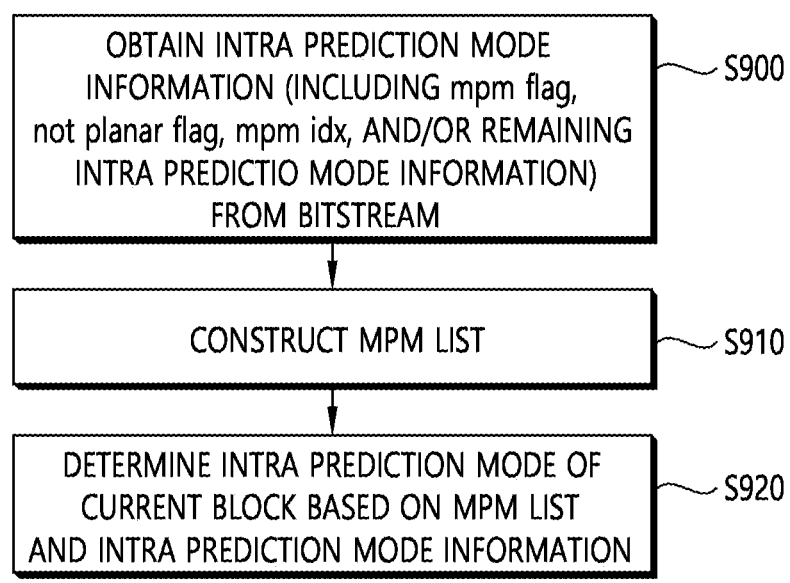
FIG. 9 illustrates an example of the intra prediction method based on the MPM mode in the decoding apparatus to which the exemplary embodiments of the present document are applicable.

FIG. 9 illustrates an example of the intra prediction method based on the MPM mode in the decoding apparatus to which the exemplary embodiments of the present document are applicable. The decoding apparatus illustrated in FIG. 9 may determine the intra prediction mode corresponding to the intra prediction mode information determined and signaled by the encoding apparatus illustrated in FIG. 8.

Referring to FIG. 9, the decoding apparatus obtains the intra prediction mode information from the bitstream (S900). As described above, the intra prediction mode information may include at least one of the mpm flag, the not planar flag, the mpm index, and the remaining intra prediction mode.

The decoding apparatus constructs the MPM list (S910). The MPM list is composed of the same MPM list configured in the encoding apparatus. That is, the MPM list may also include the intra prediction mode of the neighboring block, and further include the specific intra prediction modes according to a predetermined method as well. A specific method for constructing the MPM list will be described later.

Although it is illustrated that S910 is performed later than S900, it is illustrative, and S910 may also be performed earlier than S900 and S900 and S910 may also be simultaneously performed.

The decoding apparatus determines the intra prediction mode of the current block based on the MPM list and the intra prediction mode information (S920).

As an example, if the value of the mpm flag is 1, the decoding apparatus may derive the planar mode as the intra prediction mode of the current block or derive the candidate indicated by the mpm index among the MPM candidates in the MPM list (based on the not planar flag) as the intra prediction mode of the current block. Here, the MPM candidates may also indicate only the candidates included in the MPM list, or also include the planar mode which is applicable to a case where the value of the mpm flag is 1 as well as to the candidates included in the MPM list.

As another example, if the value of the mpm flag is 0, the decoding apparatus may derive the intra prediction mode indicated by the remaining intra prediction mode information among the remaining intra prediction modes, which are not included in the MPM list and the planar mode, as the intra prediction mode of the current block.

As still another example, if the intra prediction type of the current block is the specific type (e.g., LIP, MRL, or ISP), the decoding apparatus may also derive the planar mode or the candidate indicated by the mpm index in the MPM list as the intra prediction mode of the current block even without the confirmation of the mpm flag.

Meanwhile, an intra prediction mode may include non-directional (or non-angular) intra prediction modes and directional (or angular) intra prediction modes. For example, in the HEVC standard, intra prediction modes including 2 non-directional prediction modes and 33 directional prediction modes are used. The non-directional prediction modes may include a planar intra prediction mode, that is, No. 0, and a DC intra prediction mode, that is, No. 1. The directional prediction modes may include No. 2 to No. 34 intra prediction modes. The planar mode intra prediction mode may be called a planar mode, and the DC intra prediction mode may be called a DC mode.

Figure 10:
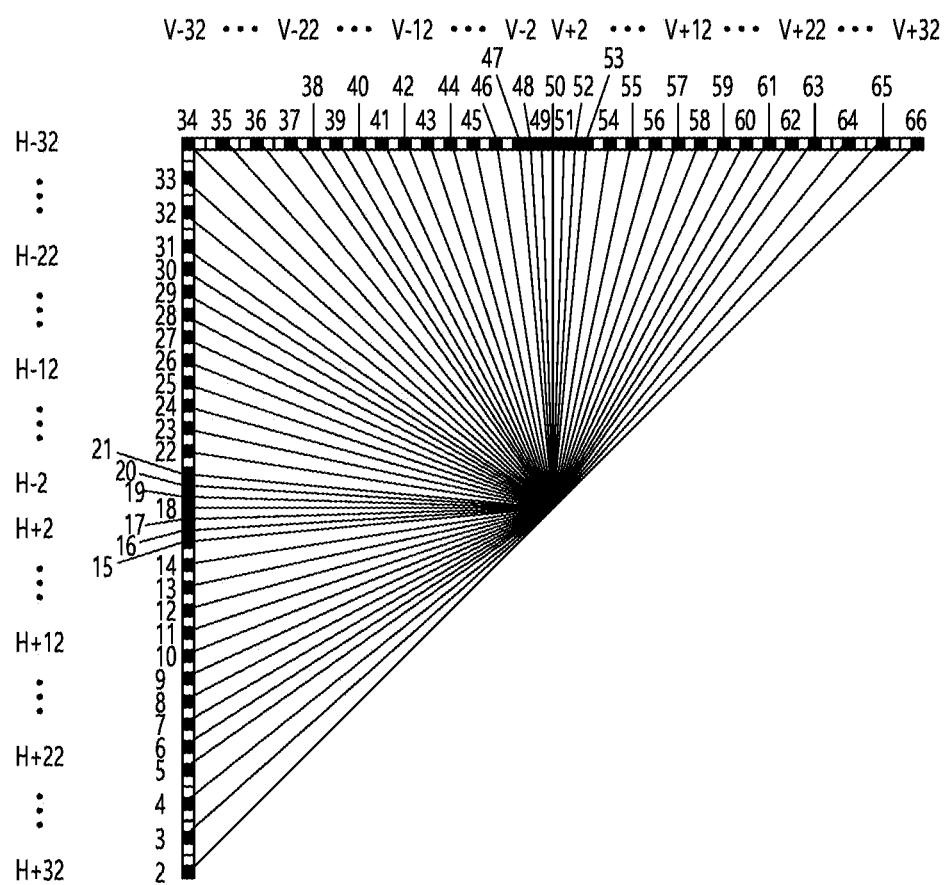
FIG. 10 illustrates an example of intra prediction modes to which the embodiment(s) of the present document may be applied.

Alternatively, in order to capture a given edge direction proposed in natural video, the directional intra prediction modes may be extended from the existing 33 modes to 65 modes as in FIG. 10. In this case, the intra prediction modes may include 2 non-directional intra prediction modes and 65 directional intra prediction modes. The non-directional intra prediction modes may include a planar intra prediction mode, that is, No. 0, and a DC intra prediction mode, that is, No. 1. The directional intra prediction modes may include Nos. 2 to 66 intra prediction modes. The extended directional intra prediction modes may be applied to blocks having all sizes, and may be applied to both a luma component and a chroma component. However, this is an example, and embodiments of this document may be applied to a case where the number of intra prediction modes is different. A No. 67 intra prediction mode according to circumstances may be further used. The No. 67 intra prediction mode may indicate a linear model (LM) mode.

FIG. 10 illustrates an example of intra prediction modes to which the embodiment(s) of the present document may be applied.

Referring to FIG. 10, modes may be divided into intra prediction modes having horizontal directionality and intra prediction modes having vertical directionality based on a No. 34 intra prediction mode having a top left diagonal prediction direction. In FIG. 10, H and V mean horizontal directionality and vertical directionality, respectively. Each of numbers −32~32 indicate displacement of a 1/32 unit on a sample grid position. The Nos. 2 to 33 intra prediction modes have horizontal directionality, and the Nos. 34 to 66 intra prediction modes have vertical directionality. The No. 18 intra prediction mode and the No. 50 intra prediction mode indicate a horizontal intra prediction mode and a vertical intra prediction mode, respectively. The No. 2 intra prediction mode may be called a bottom left diagonal intra prediction mode, the No. 34 intra prediction mode may be called a top left diagonal intra prediction mode, and the No. 66 intra prediction mode may be called a top right diagonal intra prediction mode.

Meanwhile, the intra prediction may use the MRL using the multi-reference line. The MRL method may perform the intra prediction using, as the reference samples, the neighboring samples positioned in a sample line away from the upper and/or left of the current block by one to three sample distances.

Figure 11:
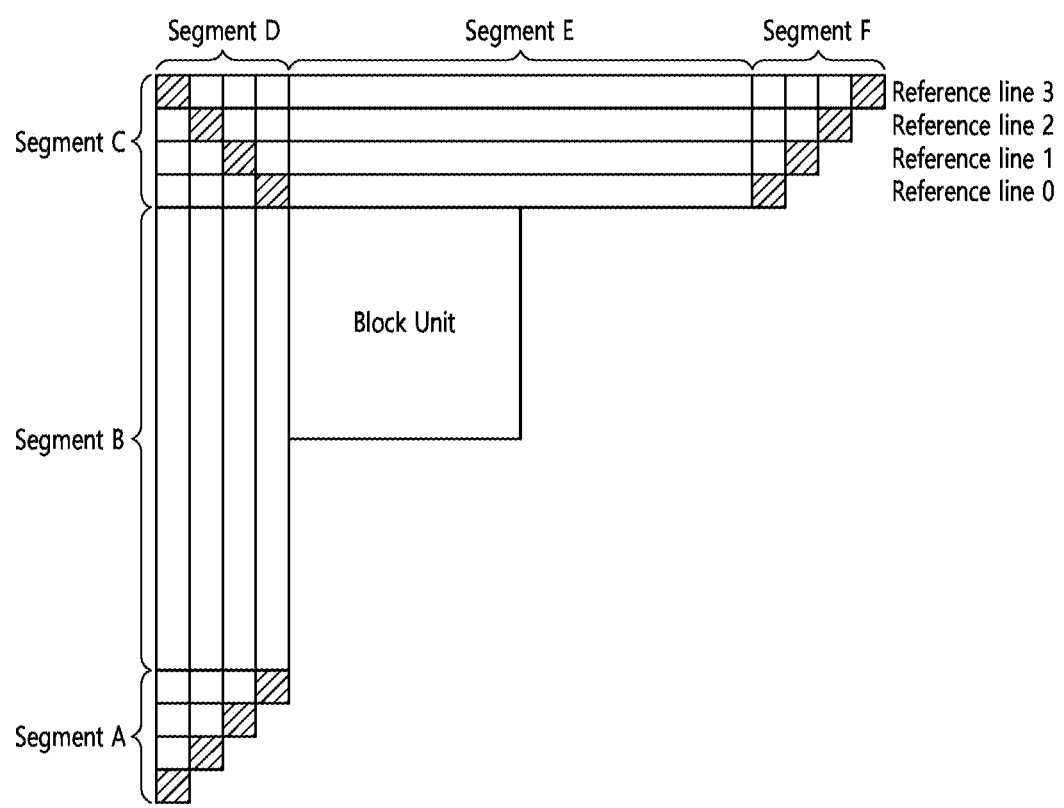
FIG. 11 illustrates an example of the reference sample lines for the intra prediction using the multi-reference line.

FIG. 11 illustrates an example of the reference sample lines for the intra prediction using the multi-reference line. A block unit illustrated in FIG. 11 may indicate the current block.

According to an exemplary embodiment, the intra prediction may use, as the reference samples for the prediction, the reference samples (or reference samples first closest to the current block, that is, reference samples positioned from the current block by a zero sample distance). According to another exemplary embodiment, the multi-reference line (MRL) intra prediction is a method using the reference samples positioned from the left and upper boundaries of the current block by a K sample distance (K is an integer of 1 or more), and may have more options and more accurate prediction performance for the reference samples than in the intra prediction using the reference samples closest to the current block (i.e., positioned from the current block by the zero sample distance). The reference sample of the current block may also be referred to as a neighboring sample of the current block or a reference line sample of the current block, and the reference line sample may also be referred to as a sample on the reference line.

Referring to FIG. 11, the positions of the neighboring reference samples positioned from the current block by 0, 1, 2, and 3 sample distances may be referred to as reference lines 0, 1, 2, and 3, respectively. The reference line may be referred to as a reference sample line, a reference sample row, or a reference sample column, or also be simply referred to as a line, a row, or a column. The reference lines 0, 1, 2, and 3 may be positioned in the order close to the current block. As an example, the multi-reference line intra prediction may be performed based on the reference lines 1, 2. As another example, the multi-reference line intra prediction may be performed based on the reference lines 1, 3. However, the multi-reference line intra prediction according to the present document is not necessarily limited to these examples.

Further, the intra prediction based on a multiple reference line (MRL) may signal reference line information for representing which reference line is used. For example, the reference line information may be signaled in the form of intra_luma_ref_idx syntax elements. If the intra_luma_ref_idx value is equal to 0, it may be represented that the intra prediction is performed using reference samples first closest to the current block (i.e., located in a zero sample distance). If the intra_luma_ref_idx value is equal to 1, it may be represented that the intra prediction is performed using reference samples second closest to the current block (i.e., located in a one sample distance). If the intra_luma_ref_idx value is equal to 2, it may be represented that the intra prediction is performed using reference samples third or fourth closest to the current block (i.e., located in a 2 or 3 sample distance).

Meanwhile, intra prediction may perform encoding/decoding without split in consideration of a block intended to be currently coded (encoded/decoded) in one coding unit. Further, intra prediction may also be performed by dividing the block intended to be currently coded into subpartitions. Such an intra prediction method may be called intra subpartitions (ISP) intra prediction or ISP-based intra prediction. That is, the ISP method may perform the intra prediction by splitting the block intended to be currently coded in a horizontal direction or in a vertical direction. In this case, a reconstructed block may be generated by performing encoding/decoding in the unit of a split block, and the reconstructed block may be used as a reference block of the next split block. The current intra subpartitions (ISP) may be split in accordance with the size of a block as in Table 1. Table 1 below represents the number of subpartitions in accordance with the block size when the intra subpartitions (ISP) mode is applied to the current block.

TABLE 1

| Block size (CU) | Number of times of partitioning |
| --- | --- |
| 4 × 4 | Not partitioned |
| 4 × 8, 8 × 4 | 2 |
| All other cases | 4 |

FIG. 12 illustrates an example of subpartitions being split in accordance with intra subpartitions (ISP).

In FIG. 12, (a) represents an example in which the current block (original H×W partition, i.e., CU of an H×W size) is partitioned in the horizontal direction and in the vertical direction in case that the current block is a 4×8 block or 8×4 block.

As illustrated in (a) of FIG. 12, the 4×8 block or 8×4 block may be partitioned in the horizontal direction or in the vertical direction. In case that the block is partitioned in the horizontal direction, it may be split into two subpartition blocks each having a (H/2)×W size, and in case of being partitioned in the vertical direction, it may be split into two subpartition blocks each having a H×(W/2) size.

In FIG. 12, (b) represents an example in which the current block (original H×W partition, i.e., CU of an H×W size) is partitioned in the horizontal direction and in the vertical direction in case that the current block is a remaining block excluding 4×4, 4×8 and 8×4 blocks.

As illustrated in (b) of FIG. 12, the H×W block excluding the 4×4, 4×8 and 8×4 blocks may be partitioned in the horizontal direction or in the vertical direction. In case that the block is partitioned in the horizontal direction, it may be split into four subpartition blocks each having a (H/4)×W size, and in case of being partitioned in the vertical direction, it may be split into four subpartition blocks each having a H×(W/4) size.

In order to reduce encoding complexity, the intra subpartition method generates the MPM list in accordance with the respective partition methods (horizontal partition and vertical partition), and generates an optimum mode through comparison of suitable prediction modes among prediction modes in the generated MPM list from a viewpoint of rate distortion optimization (RDO). Further, in case that the above-described multiple reference line (MRL) intra prediction is used, the intra subpartition method is unable to be used. That is, only in case of using the zeroth reference line (i.e., the intra_luma_ref_idx value is equal to 0), the intra subpartition method can be applied. Further, in case of using the above-described intra subpartition method, the above-described PDPC is unable to be used.

According to the intra subpartition method, whether to apply the intra subpartitions is first transmitted in the unit of a block, and if the current block uses the intra subpartitions (intra_subpartitions_mode_flag), information on whether the partition method is horizontal partition or vertical partition (intra_subpartitions_split_flag) is then encoded/decoded.

In case that the intra subpartition method is applied, the intra prediction mode for the current block is equally applied to subpartitions, and neighboring reference samples are derived and used in the unit of subpartitions to enhance the intra prediction performance. That is, in case that the intra subpartition method is applied, a residual sample processing procedure is performed in the unit of subpartitions. In other words, intra prediction samples are derived with respect to the respective subpartitions, and residual signals (residual samples) for the corresponding subpartitions are added to the derived intra prediction samples to obtain reconstructed samples. The residual signals (residual samples) may be derived through dequantization/inverse transform procedures based on residual information (quantized transform coefficient information or residual coding syntax) in the above-described bitstream. That is, derivation of prediction samples and derivation of the residual samples for a first subpartition may be performed, and based on this, reconstructed samples for the first subpartition may be derived. In this case, in case of deriving prediction samples for a second subpartition, some of the reconstructed samples in the first subpartition (e.g., top or left neighboring reference samples of the second subpartition) may be used as neighboring reference samples for the second subpartition. In the same manner, derivation of the prediction samples and derivation of the residual samples for the second subpartition may be performed, and based on this, reconstructed samples for the second subpartition may be derived. In this case, in case of deriving prediction samples for a third subpartition, some of the reconstructed samples in the second subpartition (e.g., top or left neighboring reference samples of the third subpartition) may be used as neighboring reference samples for the third subpartition. The intra subpartition method may be applied in the same manner even with respect to the remaining subpartitions.

As described above, as the intra prediction, the multiple reference line (MRL)-based intra prediction method and the subpartition (ISP)-based intra prediction method may be applied, or a normal intra prediction method excluding specific intra prediction methods, such as MRL, ISP, and the like, may be applied. In this case, the normal intra prediction, which is not the specific intra prediction type (e.g., MRL or ISP), performs intra prediction encoding/decoding using 67 intra prediction modes, and the multiple reference line intra prediction performs intra prediction encoding/decoding using 65 intra prediction modes excluding the planar mode and the DC mode. Further, the subpartition intra prediction performs intra prediction encoding/decoding using 66 intra prediction modes excluding the DC mode. Since all the above-described three kinds of intra predictions (existing intra prediction, multiple reference line intra prediction, and subpartition intra prediction) perform the intra prediction encoding/decoding using different numbers of intra prediction modes, they have different MPM list generation methods for their predictions.

More specifically, the normal intra prediction constructs an MPM list including 6 MPM candidates using all of 67 intra prediction modes. The multiple reference line intra prediction does not use the planar mode and the DC mode, and constructs an MPM list including 6 MPM candidates using 65 intra prediction modes excluding the planar mode and the DC mode. The subpartition intra prediction does not use the DC mode, and constructs an MPM list including 6 MPM candidates using 66 intra prediction modes excluding the DC mode. In this case, the subpartition intra prediction constructs the MPM list in different methods depending on the horizontal partition and the vertical partition. As described above, for one intra prediction, the MPM list including 6 MPM candidates is constructed using the different methods.

Accordingly, in order to increase the coding efficiency of the intra prediction, a unified MPM list generation method may be used. Accordingly, this document proposes a scheme capable of constructing the MPM list being used in the normal intra prediction, multiple reference line intra prediction, and subpartition intra prediction in one unified method. In an embodiment, the MPM list for the normal intra prediction, multiple reference line intra prediction, and subpartition intra prediction can be generated after a unified temporary MPM list is generated. In another embodiment, after the unified temporary MPM list is generated, a specific prediction mode (e.g., DC mode) may be added in accordance with a specific intra prediction type (i.e., normal intra prediction, multiple reference line intra prediction, and subpartition intra prediction), and in consideration of this, the MPM list for the normal intra prediction, the multiple reference line intra prediction, and the subpartition intra prediction may be generated.

By using the unified MPM list generation method according to embodiments of this document, the encoding/decoding structure of the intra prediction can be simplified, and the video encoding/decoding efficiency can be increased through an increase of the intra mode encoding/decoding efficiency.

Figure 13:
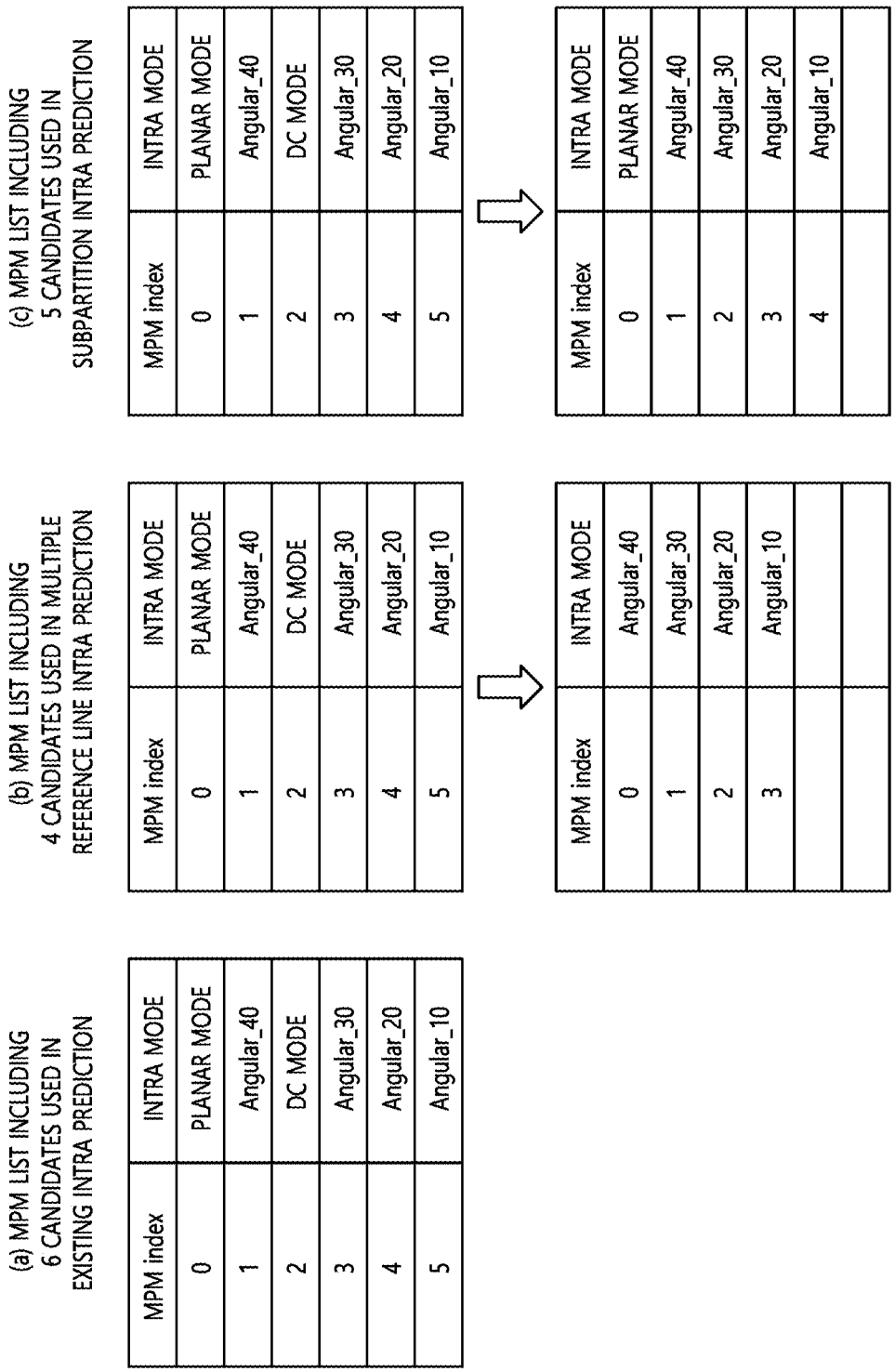
FIG. 13 is a diagram explaining an embodiment of a method for generating a unified MPM list according to this document.

FIG. 13 is a diagram explaining an embodiment of a method for generating a unified MPM list according to this document.

In this embodiment, a method for constructing a unified MPM list in consideration of an unused specific prediction mode (e.g., planar mode or DC mode) in accordance with a specific intra prediction type (i.e., normal intra prediction, multiple reference line intra prediction, and subpartition intra prediction) will be described.

As an embodiment, a method for generating an MPM list including 6 MPM candidates being used in a normal intra prediction may be equally applied to MPM list generation methods of multiple reference line intra prediction and subpartition intra prediction. In this case, the MPM list generation method being used in the normal intra prediction may be the existing MPM list generation method, or a method through improvement of the existing MPM list generation method. For example, the MPM list used in the normal intra prediction may be constructed in accordance with the above-described methods of FIGS. 8 and 9.

Here, since the normal intra prediction generates the MPM list in consideration of all 67 intra prediction modes, it includes the planar mode and the DC mode. However, since the multiple reference line intra prediction does not use the planar mode and the DC mode, and the subpartition intra prediction does not use the DC mode, they may generate their respective MPM lists in consideration of this.

Referring to FIG. 13, an MPM list including 6 MPM candidates being used in the normal intra prediction may be temporarily generated. For convenience in explanation, the temporarily first generated MPM list is called a temporary MPM list. In other words, the temporary MPM list is an MPM list (or an MPM list improved through various improved methods) including 6 MPM candidates being used in the normal intra prediction, and may be constructed in accordance with the above-described methods of FIGS. 8 and 9. Such a temporary MPM list construction method may be equally applied even when the MPM lists of the multiple reference line intra prediction and the subpartition intra prediction are generated. Accordingly, the temporary MPM list including equal 6 MPM candidates may be generated for all of the normal intra prediction, the multiple reference line intra prediction, and the subpartition intra prediction.

In this case, in case of the multiple reference line intra prediction, the planar mode and the DC mode may not be used, and in case of the subpartition intra prediction, the DC mode may not be used. In this case, a specific mode that is not used in the respective prediction methods may be removed from the equally generated temporary MPM list, and a suitable MPM list may be reconstructed in accordance with the corresponding prediction methods.

As an example, as illustrated in (a), (b), and (c) of FIG. 13, the temporary MPM list may be generated with respect to the normal intra prediction, the multiple reference line intra prediction, and the subpartition intra prediction. In this case, each of the temporary MPM lists equally includes 6 MPM candidates. Further, since the multiple reference line intra prediction does not use the planar mode and the DC mode, as illustrated in (b) of FIG. 13, the planar mode of MPM index 0 and the DC mode of MPM index 2 may be removed from the temporary MPM list, and the MPM candidates in the temporary MPM list may be rearranged. Accordingly, an MPM list including 4 MPM candidates may be finally generated. Further, since the subpartition intra prediction does not use the DC mode, as illustrated in (c) of FIG. 13, the DC mode of MPM index 2 may be removed from the temporary MPM list, and the MPM candidates in the temporary MPM list may be rearranged. Accordingly, an MPM list including 5 MPM candidates may be finally generated.

FIG. 14 is a diagram explaining another embodiment of a method for generating a unified MPM list according to this document.

In this embodiment, a method, in which a specific prediction mode (e.g., DC mode) is added in accordance with a specific intra prediction type (i.e., normal intra prediction, multiple reference line intra prediction, and subpartition intra prediction), and in consideration of this, a unified MPM list is constructed, will be described. As an example, a method for constructing a unified MPM list in case that a DC mode is additionally used in a multiple reference line intra prediction will be described.

As an embodiment, a method for generating an MPM list including 6 MPM candidates being used in a normal intra prediction may be equally applied to MPM list generation methods of multiple reference line intra prediction and subpartition intra prediction. In this case, the MPM list generation method being used in the normal intra prediction may be the existing MPM list generation method, or a method through improvement of the existing MPM list generation method. For example, the MPM list used in the normal intra prediction may be constructed in accordance with the above-described methods of FIGS. 8 and 9.

In this case, since prediction is performed through addition of the DC mode in the multiple reference line intra prediction, the DC mode is used and a planar mode is not used. Further, the DC mode is not used in the subpartition intra prediction. In this embodiment, respective MPM lists may be generated in consideration of this.

Referring to FIG. 14, an MPM list including 6 MPM candidates being used in the normal intra prediction may be temporarily generated. For convenience in explanation, the temporarily first generated MPM list is called a temporary MPM list. In other words, the temporary MPM list is an MPM list (or an MPM list improved through various improved methods) including 6 MPM candidates being used in the normal intra prediction, and may be constructed in accordance with the above-described methods of FIGS. 8 and 9. Such a temporary MPM list construction method may be equally applied even when the MPM lists of the multiple reference line intra prediction and the subpartition intra prediction are generated. Accordingly, the temporary MPM list including equal 6 MPM candidates may be generated for all of the normal intra prediction, the multiple reference line intra prediction, and the subpartition intra prediction.

In this case, in case of the multiple reference line intra prediction, the DC mode may be used, and the planar mode may not be used, whereas in case of the subpartition intra prediction, the DC mode may not be used. In this case, a specific mode that is not used in the respective prediction methods may be removed from the equally generated temporary MPM list, and a suitable MPM list may be reconstructed in accordance with the corresponding prediction methods.

As an example, as illustrated in (a), (b), and (c) of FIG. 14, the temporary MPM list may be generated with respect to the normal intra prediction, the multiple reference line intra prediction, and the subpartition intra prediction. In this case, each of the temporary MPM list equally includes 6 MPM candidates. Further, since the multiple reference line intra prediction additionally uses the DC mode, and does not use the planar mode, as illustrated in (b) of FIG. 14, the planar mode of MPM index 0 may be removed from the temporary MPM list, and the MPM candidates in the temporary MPM list may be rearranged. Accordingly, an MPM list including 5 MPM candidates may be finally generated. Further, since the subpartition intra prediction does not use the DC mode, as illustrated in (c) of FIG. 14, the DC mode of MPM index 2 may be removed from the temporary MPM list, and the MPM candidates in the temporary MPM list may be rearranged. Accordingly, an MPM list including 5 MPM candidates may be finally generated.

FIGS. 13 and 14 are to explain an example of generating the MPM list, and the basic concept of the proposed method is to generate the MPM list including a plurality of (e.g., 6) MPM candidates in the normal intra prediction and then to equally use the generated MPM list even in the multiple reference line intra prediction and the subpartition intra prediction. However, since a specific mode (e.g., planar mode or DC mode) is not used in the multiple reference line intra prediction and the subpartition intra prediction, the MPM candidates may be configured in consideration of this. If the specific mode (e.g., planar mode or DC mode) that is not used in the respective prediction methods exists in the MPM list, the specific mode may be removed, and the MPM candidates may be rearranged, so that the MPM list for the respective prediction methods may be constructed. Further, in the above-described embodiments, it has been explained that the MPM list (i.e., temporary MPM list) including a plurality of (e.g., 6) MPM candidates for the respective prediction methods is generated, and then the MPM list is finally constructed by removing the specific mode (e.g., planar mode or DC mode) that is not used in the respective prediction methods. However, this is merely exemplary, and the process of generating the temporary MPM list may be omitted. For example, after deriving 6 MPM candidates (without generating the temporary MPM list), the MPM list suitable for the corresponding prediction method may be constructed by excluding the specific mode (e.g., planar mode or DC mode) that is not used in the respective prediction methods. In this case, the planar mode is included in the 6 MPM candidates, and in case that the planar mode is not used like the multiple reference line intra prediction, 5 MPM candidates excluding this may be derived, and the MPM list including the 5 MPM candidates may be constructed.

Further, the above-described embodiments (embodiments of FIGS. 13 and 14) are merely exemplary to help understanding of the basic concept of the unified MPM list generation method proposed in this document. The basic concept of the method proposed in this document is to generate the unified MPM list without distinction of the normal intra prediction, the multiple reference line intra prediction, and the subpartition intra prediction in generating the MPM list. Accordingly, the MPM list generated in the normal intra prediction can be equally used even in the multiple reference line intra prediction and the subpartition intra prediction. In this case, the MPM lists suitable for the respective intra predictions can be finally constructed in consideration of the intra prediction modes that are not used in the multiple reference line intra prediction and the subpartition intra prediction.

That is, according to the embodiments proposed in this document, since the unified MPM list can be constructed, the encoding/decoding structure of the intra prediction can be simplified. Further, the overall video encoding/decoding performance can be improved through increasing of the encoding/decoding efficiency of the intra prediction mode.

Figure 15:
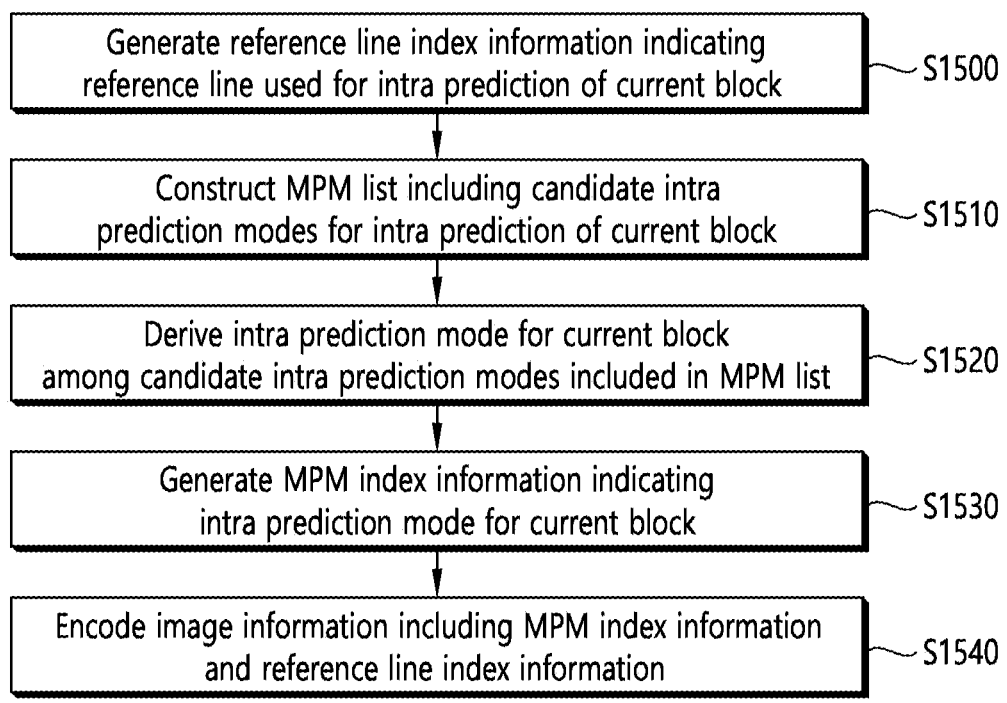
FIG. 15 is a flowchart schematically illustrating an encoding method that can be performed by an encoding apparatus according to an embodiment of the present disclosure.

FIG. 15 is a flowchart schematically illustrating an encoding method that can be performed by an encoding apparatus according to an embodiment of the present disclosure.

The method disclosed in FIG. 15 may be performed by the encoding apparatus 200 disclosed in FIG. 2. Specifically, the steps S1500 through S1530 of FIG. 15 may be performed by the predictor 220 (specifically, intra predictor 222) disclosed in FIG. 2, and the step S1540 of FIG. 15 may be performed by the entropy encoder 240 disclosed in FIG. 2. Also, the method disclosed in FIG. 15 may include the foregoing embodiments of this document. Accordingly, a concrete description of redundancies with what has been described with the foregoing embodiments will be omitted or simplified in FIG. 15.

Referring to FIG. 15, the encoding apparatus may generate reference line index information related to indicating a reference line used for intra prediction of a current block (S1500).

As described above, the reference line index information represents a reference line used for multiple reference line (MRL)-based intra prediction, which may be information indicating neighboring reference samples positioned 0, 1, 2, and 3 sample distances from the current block.

For example, the reference line index information may be represented in the form of the above intra_luma_ref_idx syntax element, and may be an index value related to indicating any of reference lines 0, 1, 2, and 3 based on the value of intra_luma_ref_idx. For example, if the value of the reference line index information (e.g., intra_luma_ref_idx) is equal to 0, it may mean that intra prediction is performed using samples of the first closest reference line (reference line 0 of FIG. 11) to the current block. If the value of the reference line index information (e.g., intra_luma_ref_idx) is not equal to 0 (i.e., the value is equal to 1, 2, or 3), it may mean that intra prediction is performed using samples of the second, third, or fourth closest reference line (reference line 1, 2, or 3) to the current block. That is, if the value of the reference line index information (e.g., intra_luma_ref_idx) is not equal to 0 (i.e., the value is equal to 1, 2, or 3), it may mean that the multiple reference line (MRL)-based intra prediction method is used.

In an embodiment, the encoding apparatus may determine whether to perform intra prediction using multiple reference lines for the current block, generate reference line index information based on the determination, and signal it to a decoding apparatus.

The encoding apparatus may construct a most probable mode (MPM) list including candidate intra prediction modes (MPM candidate modes) for the intra prediction of the current block (S1510).

In an embodiment, the encoding apparatus may construct an MPM list, based on whether a particular intra prediction method (for instance, multiple reference line intra prediction, subpartition intra prediction, etc.) is applied or not. In this case, the foregoing embodiments may be applied in the process of constructing an MPM list, which has been described in detail with reference to FIGS. 13 and 14.

For example, the encoding apparatus may generate an MPM list based on whether multiple reference line intra prediction is applied or not. For instance, the encoding apparatus may derive a DC mode as one of the candidate intra prediction modes and include it in the MPM list, based on a case in which intra prediction is performed using multiple reference lines for the current block—that is, the value of the reference line index information is not equal to 0.

Moreover, if intra prediction is performed using multiple reference lines as described above, a planar mode may not be available. Accordingly, the encoding apparatus may not use the planar mode as an intra prediction mode of the current block, based on a case in which the value of the reference line index information is not equal to 0. For example, the encoding apparatus may construct a temporary MPM list for multiple reference line intra prediction. In this case, if the planar mode is included among the candidate intra prediction modes in the temporary MPM list, the encoding apparatus may remove the planar mode from the temporary MPM list and reconstruct the temporary MPM list as an MPM list. Here, the process of constructing a temporary MPM list may be omitted depending on the method of implementation of an MPM list. For example, since the planar mode is not used when the value of the reference line index information is not equal to 0, it is determined that the planar mode is not used as an intra prediction mode based on the value of the reference line index information, first, and then five candidate intra prediction modes (including the DC mode), excluding the planar mode from six candidate intra prediction modes may be derived and constructed into an MPM list. Accordingly, an MPM list may be implemented without an intermediate process of constructing a temporary MPM list according to an algorithm for implementing the MPM list.

In addition, the encoding apparatus may generate and signal information related to indicating whether the planar mode is used as the intra prediction mode of the current block or not. For example, planar flag information may be used as information indicating whether the planar mode is used as the intra prediction mode of the current block or not. The planar flag information may be the above not planar flag (e.g., intra_luma_not_planar_flag). If the value of the planar flag information (i.e., not planar flag) is equal to 1, it may mean that the planar mode is not used as the intra prediction mode of the current block, and if the value of the planar flag information (i.e., not planar flag) is equal to 0, it may mean that the planar mode is used as the intra prediction mode of the current block.

In an embodiment, the encoding apparatus may not signal the planar flag information (i.e., not planar flag), based on a case in which the value of the reference line index information is not equal to 0. If the planar flag information (i.e., not planar flag) is not signaled, the value of the planar flag information (i.e., not planar flag) may be inferred as 1 which indicates that the planar mode is not used as the intra prediction mode of the current block. That is, since the planar mode is not used as the intra prediction mode of the current block if the value of the reference line index information is not equal to 0 as described above, the planar flag information (i.e., not planar flag) may not be signaled but its value may be inferred as 1, thereby saving the number of bits.

Alternatively, for another example, the encoding apparatus may generate an MPM list based on subpartition mode information related to indicating whether subpartition intra prediction is used for the current block or not. For example, the subpartition mode information may use the above-described intra_subpartitions_mode_flag syntax element, and if the value of the intra_subpartitions_mode_flag is equal to 1, it may mean that subpartition intra prediction is used for the current block, and if the value of the intra_subpartitions_mode_flag is equal to 0, it may mean that subpartition intra prediction is not used for the current block. If subpartition intra prediction is used as described above, the DC mode may not be available. Accordingly, if subpartition mode information indicates that subpartition intra prediction is used for the current block (e.g., the value of the intra_subpartitions_mode_flag is equal to 1), the encoding apparatus may not use the DC mode as the intra prediction mode of the current block. For example, the encoding apparatus may construct a temporary MPM list for subpartition intra prediction. In this case, if the DC mode is included among the candidate intra prediction modes in the temporary MPM list, the encoding apparatus may remove the DC mode from the temporary MPM list and reconstruct the temporary MPM list as an MPM list. Here, the process of constructing a temporary MPM list may be omitted depending on the method of implementation of an MPM list. For example, since the DC mode is not used when subpartition intra prediction is used, the DC mode is not included among the candidate intra prediction modes, thereby finally constructing an MPM list including five candidate intra prediction modes. Accordingly, the MPM list may be implemented without an intermediate process of constructing a temporary MPM list.

In some embodiments, if the value of the reference line index information is equal to 0, the encoding apparatus may generate subpartition mode information and signal it to the decoding apparatus. In other words, if multiple reference lines are not used (i.e., intra prediction is performed using samples of the first closest reference line to the current block), the encoding apparatus may determine whether to perform subpartition intra prediction or not and generate subpartition mode information based on the determination. In this case, if the value of the reference line index information is equal to 0 and the value of the subpartition mode information is equal to 1, the encoding apparatus may not use the DC mode as the intra prediction mode of the current block. That is, in this case, the encoding apparatus may generate an MPM list by not including the DC mode among the candidate intra prediction modes.

The encoding apparatus may derive an intra prediction mode for the current block from the candidate intra prediction modes included in the MPM list (S1520).

In an embodiment, the encoding apparatus may derive an intra prediction mode having an optimum rate-distortion (RD) cost by performing various intra prediction modes for the current block, and may determine it as the intra prediction mode of the current block. In this case, the encoding apparatus may derive an optimum intra prediction mode for the current block based on intra prediction modes including two non-directional intra prediction modes and 65 directional intra prediction modes. Alternatively, the encoding apparatus may determine the optimum intra prediction mode only by using the MPM candidates constructed in the MPM list.

For example, if the value of the reference line index information is not equal to 0, the encoding apparatus may derive the optimum intra prediction mode for the current block by using the MPM candidate intra prediction modes included in the MPM list. That is, in this case, the intra prediction mode for the current block may be determined only from among the candidate intra prediction modes including the DC mode in the MPM list. Moreover, the encoding apparatus may not encode/signal MPM flag information if the value of the reference line index information is not equal to 0. If the MPM flag information is not encoded/signaled, the value of the MPM flag information may be inferred as 1. As described above, the MPM flag information may be represented in the form of an intra_luma_mpm_flag syntax element. For example, if the value of the intra_luma_mpm_flag is equal to 1, it may mean that the intra prediction mode of the current block is selected from the MPM candidate intra prediction modes, and if the value of the intra_luma_mpm_flag is equal to 0, it may mean that the intra prediction mode of the current block is not selected from the MPM candidate intra prediction modes.

The encoding apparatus may generate MPM index information related to indicating the intra prediction mode for the current block (S1530).

In an embodiment, if the value of the reference line index information is not equal to 0 and the value of the MPM flag information is inferred as 1, the encoding apparatus may generate an index value related to indicating one of the candidate intra prediction modes in the MPM list and encode it as MPM index information. That is, if the value of the reference line index information is not equal to 0 and the value of the MPM flag information is inferred as 1, the MPM index information may be encoded/signaled.

The encoding apparatus may encode image information including the MPM index information and the reference line index information (S1540).

In an embodiment, as described above, the encoding apparatus may encode image information including the reference line index information, which is determined based on whether to apply multiple reference line-based intra prediction or not, and the MPM index information, which indicates the intra prediction mode of the current block derived based on the MPM list, and output the image information in the form of a bitstream. Also, as described above, the encoding apparatus may include subpartition mode information, which is determined based on whether to apply subpartition intra prediction to the current block or not, in the image information and encode it.

Moreover, the encoding apparatus may generate prediction samples for the current block based on the intra prediction mode of the current block. In an embodiment, the encoding apparatus may derive at least one neighboring reference sample from neighboring reference samples of the current block based on the intra prediction mode, and generate prediction samples based on the neighboring reference samples. Here, the neighboring reference samples may be derived based on the reference line index information, and may include, for example, neighboring reference samples included in a reference line indicated by the reference line index information.

In addition, the encoding apparatus may derive residual samples for the current block, based on the prediction samples of the current block and original samples of the current block. Also, the encoding apparatus may generate residual information for the current block based on the residual samples and encode image information including the residual information. Here, the residual information may include information, such as value information, location information, a transform scheme, a transform kernel, and a quantization parameter of the quantized transform coefficients derived by performing transform and quantization on the residual samples.

That is, the encoding apparatus may encode the above image information including the intra prediction mode information (MPM index information, reference line index information, etc.) and/or residual information of the current block and output it in a bitstream.

The bitstream may be transmitted to the decoding apparatus via a network or a (digital) storage medium. Here, the network may include a broadcasting network and/or a communication network, and the digital storage medium may include various storage media such as USB, SD, CD, DVD, Blu-ray, HDD, SSD, and so on.

The above-described process of generating prediction samples for the current block may be performed by the intra predictor 222 of the encoding apparatus 200 disclosed in FIG. 2, the process of deriving residual samples may be performed by the subtractor 231 of the encoding apparatus 200 disclosed in FIG. 2, and the process of generating and encoding residual information may be performed by the residual processor 230 and entropy encoder 240 of the encoding apparatus 200 disclosed in FIG. 2.

Figure 16:
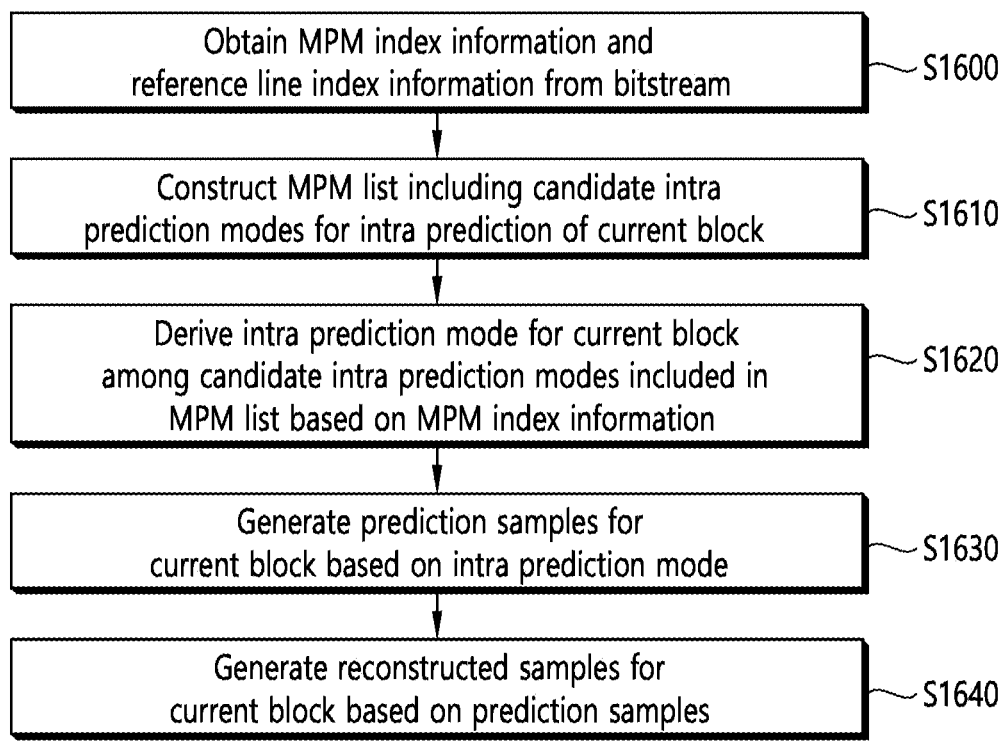
FIG. 16 is a flowchart schematically illustrating a decoding method that can be performed by a decoding apparatus according to an embodiment of the present disclosure.

FIG. 16 is a flowchart schematically illustrating a decoding method that can be performed by a decoding apparatus according to an embodiment of the present disclosure.

The method disclosed in FIG. 16 may be performed by the decoding apparatus 300 disclosed in FIG. 3. Specifically, the steps S1600 through S1630 of FIG. 16 may be performed by the entropy decoder 310 and/or predictor 330 (specifically, intra predictor 331) disclosed in FIG. 3, and the step S1640 of FIG. 16 may be performed by the adder 340 disclosed in FIG. 3. Also, the method disclosed in FIG. 16 may include the foregoing embodiments of this document. Accordingly, a concrete description of redundancies with what has been described with the foregoing embodiments will be omitted or simplified in FIG. 16.

Referring to FIG. 16, the decoding apparatus may obtain most probable mode (MPM) index information and reference line index information from a bitstream (S1600).

As described above, the reference line index information represents a reference line used for multiple reference line (MRL)-based intra prediction, which may be information indicating neighboring reference samples positioned 0, 1, 2, and 3 sample distances from the current block.

For example, the reference line index information may be represented in the form of an intra_luma_ref_idx syntax element, and may be an index value related to indicating any of reference lines 0, 1, 2, and 3 based on the value of intra_luma_ref_idx. For example, if the value of reference line index information (e.g., intra_luma_ref_idx) is equal to 0, it may mean that intra prediction is performed using samples of the first closest reference line (reference line 0 of FIG. 11) to the current block. If the value of the reference line index information (e.g., intra_luma_ref_idx) is not equal to 0 (i.e., the value is equal to 1, 2, or 3), it may mean that intra prediction is performed using samples of the second, third, or fourth closest reference line (reference line 1, 2, or 3) to the current block. That is, if the value of the reference line index information (e.g., intra_luma_ref_idx) is not equal to 0 (i.e., the value is equal to 1, 2, or 3), it may mean that the multiple reference line (MRL)-based intra prediction method is used.

In an embodiment, the decoding apparatus may obtain a reference line index information (e.g., intra_luma_ref_idx) syntax element from the bitstream, and parse (decode) it. Also, the decoding apparatus may obtain the value of the reference line index information (e.g., intra_luma_ref_idx) based on a parsing result and determine whether multiple reference line intra prediction is applied or not based on this value.

Moreover, the decoding apparatus may obtain the MPM index information related to indicating the intra prediction mode for the current block among candidate intra prediction modes in an MPM list, from the bitstream, and parse (decode) it. That is, the decoding apparatus may derive the intra prediction mode of the current block from the MPM list based on the MPM index information.

The decoding apparatus may construct an MPM list including candidate intra prediction modes for intra prediction of a current block (S1610).

In an embodiment, the decoding apparatus may construct an MPM list, based on whether a particular intra prediction method (for instance, multiple reference line intra prediction, subpartition intra prediction, etc.) is applied or not. In this case, the foregoing embodiments may be applied in the process of constructing an MPM list, which has been described in detail with reference to FIGS. 13 and 14.

In an example, the decoding apparatus may determine whether multiple reference line intra prediction is applied or not based on the reference line index information, and accordingly generate an MPM list. For instance, the decoding apparatus may derive a DC mode as one of the candidate intra prediction modes and include it in the MPM list, based on a case in which intra prediction is performed using multiple reference lines for the current block—that is, the value of the reference line index information is not equal to 0.

Moreover, if intra prediction is performed using multiple reference lines as described above, a planar mode may not be available. Accordingly, the decoding apparatus may not use the planar mode as an intra prediction mode of the current block, based on a case in which the value of the reference line index information is not equal to 0. For example, the decoding apparatus may construct a temporary MPM list for multiple reference line intra prediction. In this case, if the planar mode is included among the candidate intra prediction modes in the temporary MPM list, the decoding apparatus may remove the planar mode from the temporary MPM list and reconstruct the temporary MPM list as an MPM list. Here, the process of constructing a temporary MPM list may be omitted depending on the method of implementation of an MPM list. For example, since the planar mode is not used when the value of the reference line index information is not equal to 0, it is determined that the planar mode is not used as an intra prediction mode based on the value of the reference line index information, first, and then five candidate intra prediction modes (including the DC mode), excluding the planar mode from six candidate intra prediction modes may be derived and constructed into an MPM list. Accordingly, an MPM list may be implemented without an intermediate process of constructing a temporary MPM list according to an algorithm for implementing the MPM list.

In addition, the decoding apparatus may obtain information related to indicating whether the planar mode is used as the intra prediction mode of the current block or not, from the bitstream. In this case, planar flag information may be used as information indicating whether the planar mode is used as the intra prediction mode of the current block or not. The planar flag information may be the above not planar flag (e.g., intra_luma_not_planar_flag). If the value of the planar flag information (i.e., not planar flag) is equal to 1, it may mean that the planar mode is not used as the intra prediction mode of the current block, and if the value of the planar flag information (i.e., not planar flag) is equal to 0, it may mean that the planar mode is used as the intra prediction mode of the current block.

In an embodiment, if the value of the reference line index information is not equal to 0, the planar flag information (i.e., not planar flag) may not be signaled. In this case, the decoding apparatus may not obtain the planar flag information (i.e., not planar flag) from the bitstream. Thus, the value of the planar flag information (i.e., not planar flag) may be inferred as 1, based on a case in which the value of the reference line index information is not equal to 0. If the value of the planar flag information (i.e., not planar flag) is inferred as 1, it may mean that the planar mode is not used as the intra prediction mode of the current block. That is, since the planar mode is not used as the intra prediction mode of the current block if the value of the reference line index information is not equal to 0 as described above, the planar flag information (i.e., not planar flag) may not be signaled but its value may be inferred as 1, thereby saving the number of bits.

Alternatively, for another example, the decoding apparatus may generate an MPM list based on subpartition mode information related to indicating whether subpartition intra prediction is used for the current block or not. For example, the subpartition mode information may use the above-described intra_subpartitions_mode_flag syntax element, and if the value of the intra_subpartitions_mode_flag is equal to 1, it may mean that subpartition intra prediction is used for the current block, and if the value of the intra_subpartitions_mode_flag is equal to 0, it may mean that subpartition intra prediction is not used for the current block. If subpartition intra prediction is used as described above, the DC mode may not be available. Accordingly, if the subpartition mode information indicates that subpartition intra prediction is used for the current block (e.g., the value of the intra_subpartitions_mode_flag is equal to 1), the decoding apparatus may not use the DC mode as the intra prediction mode of the current block. For example, the decoding apparatus may construct a temporary MPM list for subpartition intra prediction. In this case, if the DC mode is included among the candidate intra prediction modes in the temporary MPM list, the decoding apparatus may remove the DC mode from the temporary MPM list and reconstruct the temporary MPM list as an MPM list. Here, the process of constructing a temporary MPM list may be omitted depending on the method of implementation of an MPM list. For example, since the DC mode is not used when subpartition intra prediction is used, the DC mode is not included among the candidate intra prediction modes, thereby finally constructing an MPM list including five candidate intra prediction modes. Accordingly, the MPM list may be implemented without an intermediate process of constructing a temporary MPM list.

In some embodiments, if the value of the reference line index information is equal to 0, the decoding apparatus may obtain subpartition mode information from the bitstream. In other words, if multiple reference lines are not used (i.e., intra prediction is performed using samples of the first closest reference line to the current block), the decoding apparatus may obtain subpartition information related to indicating whether to perform subpartition intra prediction or not and decode it. In this case, if the value of the reference line index information is equal to 0 and the value of the subpartition mode information is equal to 1, the decoding apparatus may not use the DC mode as the intra prediction mode of the current block. That is, in this case, the decoding apparatus may generate an MPM list by not including the DC mode among the candidate intra prediction modes.

The decoding apparatus may derive an intra prediction mode for the current block from the candidate intra prediction modes included in the MPM list based on the MPM index information (S1620).

In an embodiment, the decoding apparatus may obtain intra prediction mode information for the current block from the bitstream. The intra prediction mode information is information for indicating the intra prediction mode of the current block, which may include MPM flag information, MPM index information, remaining mode information, etc.

In this case, if the value of the reference line index information is not equal to 0, the MPM flag information may not be signaled from the encoding apparatus. If the MPM flag information is not signaled, the decoding apparatus may infer the value of the MPM flag information as 1. As described above, the MPM flag information may be represented in the form of an intra_luma_mpm_flag syntax element. For example, if the value of the intra_luma_mpm_flag is equal to 1, it may mean that the intra prediction mode of the current block is selected from the MPM candidate intra prediction modes, and if the value of the intra_luma_mpm_flag is equal to 0, it may mean that the intra prediction mode of the current block is not selected from the MPM candidate intra prediction modes.

Moreover, if the value of the reference line index information is not equal to 0 and the value of the MPM flag information is derived as 1, the MPM index information may be signaled from the encoding apparatus. That is, the decoding apparatus may obtain the MPM index information from the bitstream and decode it. As described above, the MPM index information includes an index value related to indicating the intra prediction mode for the current block among the candidate intra prediction modes included in the MPM list, and may be represented in the form of an intra_luma_mpm_idx syntax element, for example.

That is, if the value of the reference line index information is not equal to 0 and the value of the MPM flag information is derived as 1, the decoding apparatus may obtain and decode the MPM index information, and derive the intra prediction mode of the current block from the MPM list based on the MPM index information.

The decoding apparatus may generate prediction samples for the current block based on the intra prediction mode of the current block (S1630).

In an embodiment, the decoding apparatus may derive at least one neighboring reference sample from neighboring reference samples of the current block based on the above derived intra prediction mode, and generate prediction samples based on the neighboring reference samples. Here, the neighboring reference samples may be derived based on the reference line index information, and may include, for example, neighboring reference samples included in a reference line indicated by the reference line index information.

The decoding apparatus may generate reconstructed samples for the current block based on the prediction samples (S1640).

In an embodiment, the decoding apparatus may immediately use the prediction samples as the reconstructed samples according to the prediction mode, or may add residual samples to the prediction samples to generate the reconstructed samples.

If there are residual samples for the current block, the decoding apparatus may receive information on residuals for the current block. The information on residuals may include transform coefficients for the residual samples. The decoding apparatus may derive residual samples (or a residual sample array) for the current block based on the residual information. The decoding apparatus may generate reconstructed samples based on the prediction samples and the residual samples, and may derive a reconstructed block or reconstructed picture based on the reconstructed samples. Afterwards, as described above, the decoding apparatus may apply an in-loop filtering procedure such as deblocking filtering and/or an SAO procedure to the reconstructed picture when necessary, in order to improve subjective/objective image quality.

In the above-described embodiments, the methods are explained based on flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information for implementation (ex. information on instructions) or an algorithm may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VOD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 17:
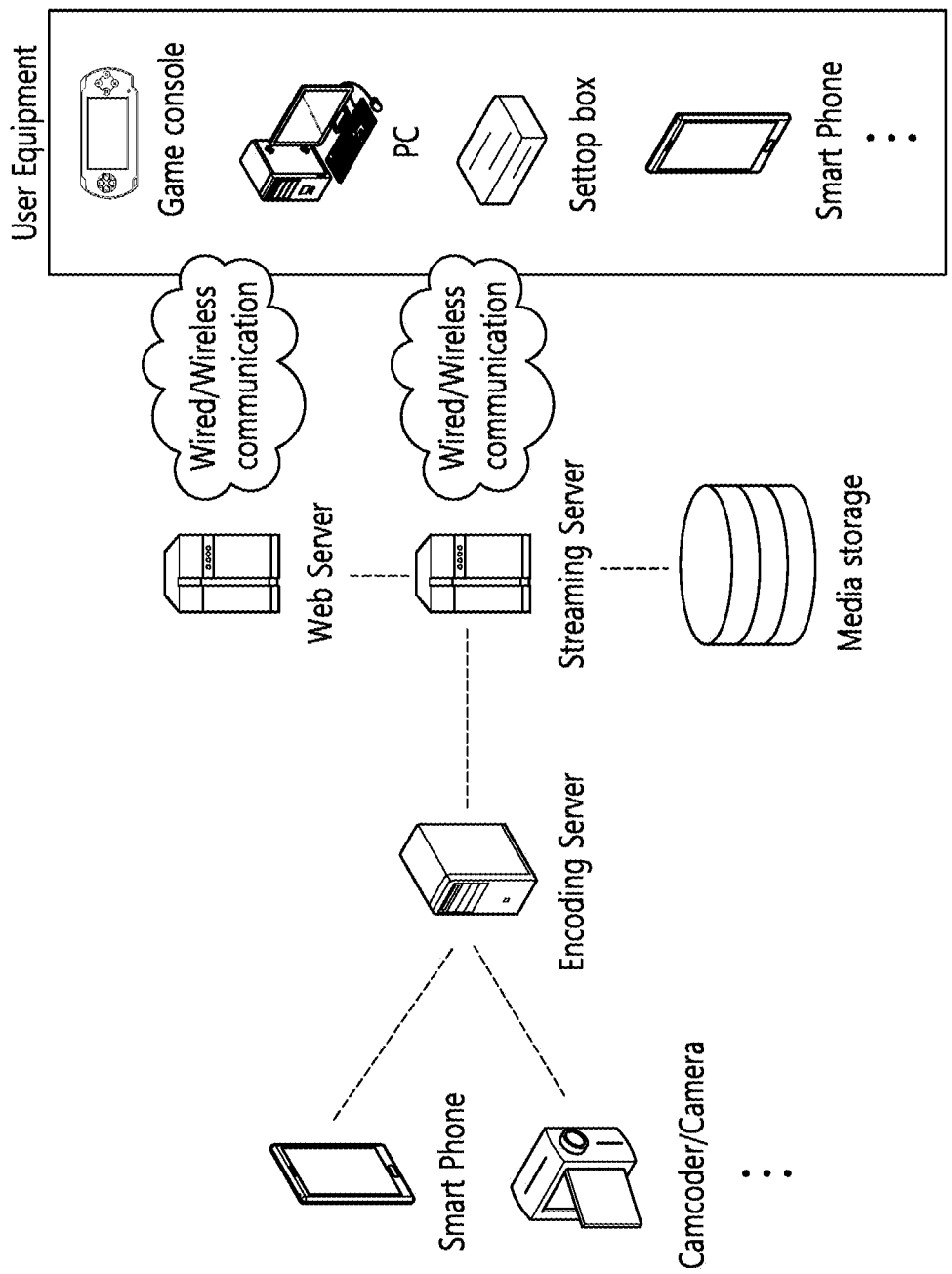
FIG. 17 illustrates an example of a content streaming system to which embodiments disclosed in this document may be applied.

FIG. 17 illustrates an example of a content streaming system to which embodiments disclosed in this document may be applied.

Referring to FIG. 17 the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

(Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.)

What is claimed is:

1. An image decoding apparatus, comprising:
a memory: and
at least one processor connected to the memory, the at least one processor configured to:
obtain Most Probable Mode (MPM) index information and reference line index information from a bitstream;
construct a MPM list including candidate intra prediction modes for intra prediction of a current block;
derive an intra prediction mode for the current block among the candidate intra prediction modes included in the MPM list based on the MPM index information;
generate prediction samples for the current block based on the intra prediction mode; and
generate reconstructed samples for the current block based on the prediction samples,
wherein in the constructing of the MPM list, a DC mode is derived as one of the candidate intra prediction modes and included in the MPM list,
wherein the reference line index information is related to a value indicating a reference line used for intra prediction of the current block, and
wherein based on the value of the reference line index information being not equal to 0, a planar mode is not used as the intra prediction mode of the current block, the planar mode is not included in the MPM list, a number of candidate intra prediction modes in the MPM list is five, and the intra prediction mode of the current block is derived from the MPM list based on the MPM index information.

2. The image decoding apparatus of claim 1, wherein based on the value of the reference line index information being not equal to 0, planar flag information related to indicating whether the planar mode is used as the intra prediction mode of the current block or not is not signaled, and
wherein a value of the planar flag information is inferred as 1 indicating that the planar mode is not used as the intra prediction mode of the current block.

3. The image decoding apparatus of claim 1, the at least one processor further configured to construct a temporary MPM list,
wherein, in the constructing of the MPM list, based on a case in which the planar mode is included among candidate intra prediction modes in the temporary MPM list, the MPM list is reconstructed by removing the planar mode.

4. The image decoding apparatus of claim 1, wherein the DC mode is not used as the intra prediction mode of the current block, based on subpartition mode information related to indicating whether subpartition intra prediction is used for the current block or not.

5. The image decoding apparatus of claim 4, the at least one processor further configured to obtain the subpartition mode information based on the value of the reference line index information being equal to 0,
wherein based on the subpartition mode information indicating that subpartition intra prediction is used for the current block, the DC mode is not used as the intra prediction mode of the current block.

6. The image decoding apparatus of claim 1, wherein the reference line index information having a value of 0 means that intra prediction is performed using samples of the first closest reference line to the current block, and
wherein the reference line index information having a non-zero value means that intra prediction is performed using samples of the second, third, or fourth closest reference line to the current block.

7. An image encoding apparatus, comprising:
a memory: and
at least one processor connected to the memory, the at least one processor configured to:
generate reference line index information related to a value indicating a reference line used for intra prediction of a current block;
construct a most probable mode (MPM) list including candidate intra prediction modes for the intra prediction of the current block;
derive an intra prediction mode for the current block among the candidate intra prediction modes included in the MPM list;
generate MPM index information related to indicating the intra prediction mode for the current block; and
encode image information including the MPM index information and the reference line index information,
wherein in the constructing of the MPM list, a DC mode is derived as one of the candidate intra prediction modes and included in the MPM list, and
wherein based on the value of the reference line index information being not equal to 0, a planar mode is not used as the intra prediction mode of the current block, the planar mode is not included in the MPM list, a number of candidate intra prediction modes in the MPM list is five, and the MPM index information is generated based on the intra prediction mode of the current block derived from the MPM list.

8. The image encoding apparatus of claim 7, wherein based on the value of the reference line index information being not equal to 0, planar flag information related to indicating whether the planar mode is used as the intra prediction mode of the current block or not is not signaled, and
wherein a value of the planar flag information is inferred as 1 indicating that the planar mode is not used as the intra prediction mode of the current block.

9. The image encoding apparatus of claim 7, the at least one processor further configured to construct a temporary MPM list,
wherein in the constructing of the MPM list, based on a case in which the planar mode is included among candidate intra prediction modes in the temporary MPM list, the MPM list is reconstructed by removing the planar mode.

10. An apparatus for transmitting data for image information, comprising:
at least one processor configured to generate a bitstream for the image information, wherein the bitstream is generated based on generating reference line index information related to a value indicating a reference line used for intra prediction of a current block, constructing a most probable mode (MPM) list including candidate intra prediction modes for the intra prediction of the current block, deriving an intra prediction mode for the current block among the candidate intra prediction modes included in the MPM list, generating MPM index information related to indicating the intra prediction mode for the current block, and encoding image information including the MPM index information and the reference line index information to generate the bitstream; and
a transmitter configured to transmit the data including the bitstream,
wherein in the constructing of the MPM list, a DC mode is derived as one of the candidate intra prediction modes and included in the MPM list, and
wherein based on the value of the reference line index information being not equal to 0, a planar mode is not used as the intra prediction mode of the current block, the planar mode is not included in the MPM list, a number of candidate intra prediction modes in the MPM list is five, and the MPM index information is generated based on the intra prediction mode of the current block derived from the MPM list.

* * * * *